United States Patent
Kleinpeter

(10) Patent No.: US 10,983,677 B2
(45) Date of Patent: Apr. 20, 2021

(54) PREFETCHING DIGITAL THUMBNAILS FROM REMOTE SERVERS TO CLIENT DEVICES BASED ON A DYNAMIC DETERMINATION OF FILE DISPLAY CRITERIA

(71) Applicant: Dropbox, Inc., San Francisco, CA (US)

(72) Inventor: Thomas Kleinpeter, Kirkland, WA (US)

(73) Assignee: DROPBOX, INC., San Francisco, CA (US)

( * ) Notice: Subject to any disclaimer, the term of this patent is extended or adjusted under 35 U.S.C. 154(b) by 59 days.

(21) Appl. No.: 16/193,157

(22) Filed: Nov. 16, 2018

(65) Prior Publication Data

US 2020/0159391 A1    May 21, 2020

(51) Int. Cl.
*G06F 3/048* (2013.01)
*G06F 3/0484* (2013.01)
*G06F 16/16* (2019.01)
*H04L 29/08* (2006.01)
(Continued)

(52) U.S. Cl.
CPC ........ *G06F 3/04842* (2013.01); *G06F 16/152* (2019.01); *G06F 16/166* (2019.01); *G06N 5/04* (2013.01); *H04L 67/04* (2013.01)

(58) Field of Classification Search
CPC .. G06F 3/0484; G06F 3/04842; G06F 16/166; G06F 16/14
See application file for complete search history.

(56) References Cited

U.S. PATENT DOCUMENTS

| 4,475,172 A | 10/1984 | Frederiksen |
| 5,321,520 A | 6/1994 | Inga et al. |
| 5,920,327 A | 7/1999 | Seidensticker, Jr. et al. |

(Continued)

FOREIGN PATENT DOCUMENTS

| JP | 2006244221 A | 9/2006 |
| JP | 2007502092 A | 2/2007 |

(Continued)

OTHER PUBLICATIONS

Non-Final Office Action from U.S. Appl. No. 16/802,099, dated Dec. 23, 2020, 7 pages.

(Continued)

*Primary Examiner* — Hua Lu
(74) *Attorney, Agent, or Firm* — Keller Jolley Preece

(57) ABSTRACT

The present disclosure relates to systems, non-transitory computer-readable media, and methods for predicting and prefetching relevant thumbnails from remote servers to client devices based on a dynamic determination of file display criteria. For example, a thumbnail prefetching system utilizes previous thumbnail requests to predict a file directory sort order and determine thumbnails the operating system at the client device will next request. The thumbnail prefetching system can then prefetch the thumbnails prior to the operating system at the client device making thumbnail requests for the files. Thus, when the operating system does request thumbnails for the pertinent files, the thumbnail prefetching system can provide the thumbnails efficiently and quickly while leaving thumbnails for other (unrequested) files stored at the remote server (and not downloaded to the client device).

20 Claims, 13 Drawing Sheets

(51) Int. Cl.
*G06F 16/14* (2019.01)
*G06N 5/04* (2006.01)

(56) References Cited

U.S. PATENT DOCUMENTS

| | | | |
|---|---|---|---|
| 5,983,263 | A | 11/1999 | Rothrock et al. |
| 6,122,411 | A | 9/2000 | Shen et al. |
| 6,144,996 | A | 11/2000 | Starnes et al. |
| 6,281,874 | B1 | 8/2001 | Sivan et al. |
| 6,496,206 | B1 | 12/2002 | Mernyk et al. |
| 6,545,687 | B2 | 4/2003 | Scott et al. |
| 6,549,674 | B1 | 4/2003 | Chui et al. |
| 6,563,517 | B1 | 5/2003 | Bhagwat et al. |
| 6,578,072 | B2 | 6/2003 | Watanabe et al. |
| 6,633,608 | B1 | 10/2003 | Miller et al. |
| 6,738,155 | B1 | 5/2004 | Rosenlund et al. |
| 6,898,601 | B2 | 5/2005 | Amado et al. |
| 7,000,188 | B1 | 2/2006 | Eustace |
| 7,092,118 | B2 | 8/2006 | Ferriere et al. |
| 7,154,621 | B2 | 12/2006 | Rodriguez et al. |
| 7,185,069 | B2 | 2/2007 | Cronin, III et al. |
| 7,423,653 | B2 | 9/2008 | Gettman et al. |
| 7,574,653 | B2 | 8/2009 | Croney et al. |
| 7,603,409 | B2 | 10/2009 | Kobayashi et al. |
| 7,737,993 | B2 | 6/2010 | Kaasila et al. |
| 7,818,355 | B2 | 10/2010 | Mills et al. |
| 7,929,027 | B2 | 4/2011 | Okamoto et al. |
| 7,991,837 | B1 | 8/2011 | Tahan et al. |
| 8,078,230 | B2 | 12/2011 | Schuler et al. |
| 8,082,327 | B2 | 12/2011 | Schlusser et al. |
| 8,161,179 | B2 | 4/2012 | Dote et al. |
| 8,185,591 | B1 | 5/2012 | Lewis |
| 8,208,006 | B2 | 6/2012 | Martin-Cocher et al. |
| 8,312,388 | B2 | 11/2012 | Yoshihama et al. |
| 8,411,758 | B2 | 4/2013 | Folgner et al. |
| 8,417,599 | B2 | 4/2013 | Wirth, Jr. et al. |
| 8,570,335 | B2 | 10/2013 | Huang et al. |
| 8,605,348 | B2 | 12/2013 | Bosma |
| 8,893,026 | B2 | 11/2014 | Lindemann et al. |
| 8,898,208 | B2 | 11/2014 | Wu et al. |
| 9,405,500 | B1 | 8/2016 | Cox |
| 9,462,054 | B2 | 10/2016 | Poletto et al. |
| 9,787,799 | B2 | 10/2017 | Grue et al. |
| 9,870,802 | B2 | 1/2018 | Carson et al. |
| 9,967,514 | B2 | 5/2018 | Thompson et al. |
| 10,051,142 | B1 | 8/2018 | Villena et al. |
| 10,491,963 | B1 | 11/2019 | Waggoner |
| 2002/0051065 | A1 | 5/2002 | Takahashi et al. |
| 2002/0054115 | A1 | 5/2002 | Mack et al. |
| 2002/0172421 | A1 | 11/2002 | Kondo et al. |
| 2003/0020749 | A1 | 1/2003 | Abu-Hakima et al. |
| 2003/0076322 | A1 | 4/2003 | Ouzts et al. |
| 2003/0218682 | A1 | 11/2003 | Lim et al. |
| 2004/0003117 | A1 | 1/2004 | McCoy et al. |
| 2004/0109063 | A1 | 6/2004 | Kusaka et al. |
| 2004/0133924 | A1 | 7/2004 | Wilkins et al. |
| 2004/0175764 | A1 | 9/2004 | Nishiyama et al. |
| 2005/0052685 | A1 | 3/2005 | Herf et al. |
| 2005/0097445 | A1 | 5/2005 | Day et al. |
| 2005/0177796 | A1 | 8/2005 | Takahashi et al. |
| 2006/0037053 | A1 | 2/2006 | McDowell et al. |
| 2006/0055944 | A1 | 3/2006 | Minakuti et al. |
| 2006/0114820 | A1 | 6/2006 | Hunt et al. |
| 2006/0152600 | A1 | 7/2006 | Hamada et al. |
| 2006/0173974 | A1 | 8/2006 | Tang et al. |
| 2006/0176305 | A1 | 8/2006 | Arcas et al. |
| 2006/0193012 | A1 | 8/2006 | Wilkins et al. |
| 2006/0242163 | A1* | 10/2006 | Miller .................... G06F 16/40 |
| 2006/0282788 | A1 | 12/2006 | Paalasmaa et al. |
| 2007/0047650 | A1 | 3/2007 | Vilei et al. |
| 2007/0133042 | A1 | 6/2007 | Park et al. |
| 2007/0156434 | A1 | 7/2007 | Martin et al. |
| 2007/0253628 | A1 | 11/2007 | Brett et al. |
| 2007/0274563 | A1 | 11/2007 | Jung et al. |
| 2007/0277202 | A1 | 11/2007 | Lin et al. |
| 2007/0294333 | A1 | 12/2007 | Yang et al. |
| 2008/0005669 | A1 | 1/2008 | Eilertsen et al. |
| 2008/0025642 | A1 | 1/2008 | Kim |
| 2008/0189625 | A1 | 8/2008 | Zuta et al. |
| 2008/0267494 | A1 | 10/2008 | Cohen et al. |
| 2009/0006978 | A1 | 1/2009 | Swift et al. |
| 2009/0049408 | A1 | 2/2009 | Naaman et al. |
| 2009/0070675 | A1 | 3/2009 | Li et al. |
| 2009/0089448 | A1 | 4/2009 | Sze et al. |
| 2009/0183060 | A1 | 7/2009 | Heller et al. |
| 2009/0187857 | A1 | 7/2009 | Tanaka et al. |
| 2009/0198744 | A1* | 8/2009 | Nakamura ............ G06F 16/192 |
| 2009/0284611 | A1 | 11/2009 | Wood et al. |
| 2010/0037137 | A1 | 2/2010 | Satou |
| 2010/0082818 | A1 | 4/2010 | Paul et al. |
| 2010/0269070 | A1* | 10/2010 | Kim ........................ G06F 16/54 |
| | | | 715/838 |
| 2011/0010629 | A1 | 1/2011 | Castro et al. |
| 2011/0125755 | A1 | 5/2011 | Kaila et al. |
| 2011/0128150 | A1 | 6/2011 | Kanga et al. |
| 2011/0157609 | A1 | 6/2011 | Brady et al. |
| 2011/0183278 | A1 | 7/2011 | Belasse et al. |
| 2011/0197123 | A1 | 8/2011 | Caine et al. |
| 2011/0200270 | A1 | 8/2011 | Kameyama |
| 2011/0206342 | A1 | 8/2011 | Thompson et al. |
| 2011/0264768 | A1 | 10/2011 | Walker et al. |
| 2011/0269437 | A1 | 11/2011 | Marusi et al. |
| 2011/0302482 | A1 | 12/2011 | Warnock et al. |
| 2012/0001935 | A1 | 1/2012 | Cok et al. |
| 2012/0011568 | A1 | 1/2012 | Tahan et al. |
| 2012/0102431 | A1 | 4/2012 | Krolczyk et al. |
| 2012/0158713 | A1 | 6/2012 | Jin |
| 2012/0166478 | A1* | 6/2012 | Das .................... G06F 16/2453 |
| | | | 707/769 |
| 2012/0209815 | A1 | 8/2012 | Carson et al. |
| 2012/0210217 | A1 | 8/2012 | Abbas et al. |
| 2012/0323868 | A1 | 12/2012 | Robbin et al. |
| 2012/0324397 | A1 | 12/2012 | Patz et al. |
| 2012/0331371 | A1 | 12/2012 | Larson et al. |
| 2013/0064439 | A1 | 3/2013 | Khurd et al. |
| 2013/0080974 | A1 | 3/2013 | Suzuki et al. |
| 2013/0111368 | A1 | 5/2013 | Laughlin |
| 2013/0159936 | A1 | 6/2013 | Yamaguchi et al. |
| 2013/0187946 | A1 | 7/2013 | Pan et al. |
| 2013/0212067 | A1* | 8/2013 | Piasecki ............. G06F 16/1787 |
| | | | 707/620 |
| 2013/0239003 | A1 | 9/2013 | Usenko et al. |
| 2013/0290862 | A1 | 10/2013 | Chand et al. |
| 2014/0040811 | A1 | 2/2014 | Brahmanapalli et al. |
| 2014/0053206 | A1 | 2/2014 | Shoykher et al. |
| 2014/0068689 | A1 | 3/2014 | Sirpal et al. |
| 2014/0074759 | A1 | 3/2014 | Lewis et al. |
| 2014/0111516 | A1 | 4/2014 | Hall et al. |
| 2014/0122505 | A1* | 5/2014 | Kudo .................. G06F 16/3346 |
| | | | 707/748 |
| 2014/0140400 | A1 | 5/2014 | George et al. |
| 2014/0189487 | A1 | 7/2014 | Kwan et al. |
| 2014/0189539 | A1 | 7/2014 | St. Clair et al. |
| 2014/0209326 | A1 | 7/2014 | Delange et al. |
| 2014/0282099 | A1 | 9/2014 | Bronder et al. |
| 2014/0359482 | A1 | 12/2014 | Sinn et al. |
| 2014/0365501 | A1 | 12/2014 | Ueno et al. |
| 2015/0039601 | A1 | 2/2015 | Harrang et al. |
| 2015/0070582 | A1 | 3/2015 | Jung et al. |
| 2015/0145889 | A1 | 5/2015 | Hanai et al. |
| 2015/0178265 | A1 | 6/2015 | Anderson et al. |
| 2015/0201001 | A1 | 7/2015 | Cabanillas et al. |
| 2015/0234885 | A1* | 8/2015 | Weinstein ............ G06F 16/152 |
| | | | 707/690 |
| 2015/0244794 | A1* | 8/2015 | Poletto ................ G06F 16/285 |
| | | | 715/748 |
| 2015/0244833 | A1 | 8/2015 | Grue et al. |
| 2015/0254692 | A1 | 9/2015 | Xu et al. |
| 2017/0123982 | A1 | 5/2017 | Haven et al. |
| 2017/0139824 | A1 | 5/2017 | Dragojevic et al. |
| 2017/0324807 | A1 | 11/2017 | Gu et al. |
| 2017/0366644 | A1 | 12/2017 | Grue et al. |
| 2018/0007323 | A1 | 1/2018 | Botusescu et al. |

(56) References Cited

U.S. PATENT DOCUMENTS

| | | | |
|---|---|---|---|
| 2018/0032259 A1* | 2/2018 | Yook | G06F 3/0605 |
| 2018/0364999 A1* | 12/2018 | Li | G06F 9/445 |
| 2019/0005048 A1 | 1/2019 | Crivello et al. | |

FOREIGN PATENT DOCUMENTS

| | | |
|---|---|---|
| JP | 2009531873 A | 9/2009 |
| JP | 2012008643 A | 1/2012 |
| JP | 2012069009 A | 4/2012 |
| WO | WO-0169585 A1 | 9/2001 |
| WO | WO-02082799 A2 | 10/2002 |
| WO | WO-2013177769 A1 | 12/2013 |

OTHER PUBLICATIONS

Notice of Allowance from U.S. Appl. No. 14/247,468, dated Oct. 21, 2020, 10 pages.
Bieber G., et al., "TiDi Browser: A Novel Photo Browsing Technique for Mobile Devices," Proceeding of SPIE, Feb. 15, 2007, vol. 6507, pp. 1-8.
Brivio P., et al., "PileBars: Scalable Dynamic Thumbnail Bars," The 13rd International Symposium on Virtual Reality, Archaeology and Cultural Heritage VAST, 2012, 8 pages.
Communication under rule 71(3) EPC Intention to Grant for European Application No. 14827975.5 dated May 18, 2020, 7 pages.
Communication under Rule 71(3) EPC of intention to grant for European Application No. 14827975.5 dated Apr. 23, 2020, 7 pages.
European Summons to Attend Oral Proceedings Pursuant to Rule 115(1) EPC for EP Application No. 14827975.5 dated Oct. 28, 2019, 8 pages.
Examination Report for Australian Application No. 2017232144 dated Sep. 14, 2018, 7 pages.
Examination Report for EP Application No. 14827975.5 dated Feb. 20, 2019, 20 pages.
Final Office Action from U.S. Appl. No. 14/247,468, dated Jan. 13, 2020, 25 pages.
International Search Report and Written Opinion for PCT Application No. PCT/US14/72005 dated Mar. 31, 2015, 14 pages.
Jiang Z., et al., "Web Prefetching in a Mobile Environment," IEEE Personal Communications, IEEE Communications Society, vol. 5 (5), Oct. 1, 1998, pp. 25-34.
Lin C., et al., "Fast Browsing of Large-scale Images Using Server Prefetching and Client Caching Techniques," Located Via SPIE http://proceedings.spiedigitallibrary.org/proceeding.aspx?articleid=905231, Jul. 18, 1999, 12 pages.
Ma W.Y., et al., "Framework for Adaptive Content Delivery in Heterogeneous Network Environments," Proceedings of SPIE, SPIE—International Society for Optical Engineering, vol. 3969, DOI:10.1117/12.373537, ISSN 0277-786X, ISBN 978-1-62841-213-0, XP002374871, Jan. 24, 2000, pp. 86-100.
Moshfeghi M., et al., "Efficient image browsing with JPEG2000 internet protocol," located via SPIE—http://proceedings.spiedigitallibrary.org/proceeding.aspx?articleid=841364, Apr. 19, 2004, 12 pages.
Non-Final Office Action from U.S. Appl. No. 14/247,468, dated Jun. 15, 2020, 26 pages.
Notice of Allowance from U.S. Appl. No. 15/690,126, dated Oct. 21, 2019, 5 pages.
Notice of Allowance for U.S. Appl. No. 14/247,436 dated May 25, 2017, 5 pages.
Notice of Allowance for U.S. Appl. No. 14/927,241 dated Oct. 29, 2018, 11 pages.
Notice of Allowance from U.S. Appl. No. 15/690,126, dated May 24, 2019, 8 pages.
Notice of Allowance from U.S. Appl. No. 15/690,126, dated Feb. 6, 2020, 2 pages.
Notice of Decision to Grant of Japanese Application No. 2018-191152 dated Mar. 9, 2020, 6 pages.
Notice of Reasons for Refusal of Japanese Application No. 2018-191152 dated Nov. 11, 2019, 9 pages.
Office Action for U.S. Appl. No. 14/247,436 dated Mar. 31, 2016, 16 pages.
Office Action for U.S. Appl. No. 14/247,436 dated Sep. 30, 2016, 22 pages.
Office Action for U.S. Appl. No. 14/927,241 dated Apr. 6, 2018, 16 pages.
Plant W., et al., "Visualisation and Browsing of Image Databases," Located via SpringerLink—https://link.springer.com/chapter/10.1007%2F978-3-642-19551-8_1, 2011, pp. 3-57.
"The Layered Look: Better Responsive Images Using Multiple Backgrounds," Jun. 26, 2013, Wayback Machine, retrieved from https://web.archive.org/web/20131022160602/http://css-tricks.com/the-layered-look/ on Oct. 27, 2018, 27 pages.

* cited by examiner

| Sorted Directories 500 | | | |
|---|---|---|---|
| Name 502 | Size 504 | Modification Date 506 | File Type 508 |
| File A | File F (298 MB) | File C (10/27/18) | File A (Doc) |
| File B | File D (74.5 MB) | File B (10/26/18) | File B (Doc) |
| File C | File H (27 MB) | File G (9/13/18) | File E (Doc) |
| File D | File A (2.3 MB) | File I (6/27/18) | File I (Doc) |
| File E | File C (1.8 MB) | File A (5/10/18) | File C (JPEG) |
| File F | File B (1.6 MB) | File F (2/18/17) | File G (JPEG) |
| File G | File G (1.2 MB) | File H (2/10/16) | File H (JPEG) |
| File H | File I (797 KB) | File D (9/8/15) | File D (MOV) |
| File I | File E (28 KB) | File E (4/15/12) | File F (MOV) |

*Fig. 5A*

| File Directory Index | Sort By Name |
|---|---|
| 1 | File A |
| 2 | File B |
| 3 | File C |
| 4 | File D |
| 5 | File E |
| 6 | File F |
| 7 | File G |
| 8 | File H |
| 9 | File I |

*Fig. 5C*

PREFETCHING DIGITAL THUMBNAILS FROM REMOTE SERVERS TO CLIENT DEVICES BASED ON A DYNAMIC DETERMINATION OF FILE DISPLAY CRITERIA

BACKGROUND

Recent advancements in computing devices and networking technology have led to a variety of innovations in synchronizing digital content items for users across client devices. For example, conventional remote-based content management systems can store a primary copy of digital content items for users in a cloud-based environment and store secondary copies locally on client devices. Many client devices, particularly modern mobile devices, however, are unable to locally store full copies of digital content items, such as all of a user's photos, videos, documents, programs, and other files due to memory constraints. To handle the issue, some remote-based content management systems enable client devices to locally store partial copies of digital content items (e.g., shell files that do not include preview icons or other data regarding the digital content items). A partial copy of a digital content item (or simply "partial content item") provides metadata for the digital content item that enables a client device to show the existence of the digital content item on the client device. Indeed, partial content items appear as digital content items while being a fraction of the size, due to the data associated with partial content items not being stored on the client device, but on a remote server.

Despite the advantages of providing and managing partial content items on local client devices, the conventional remote-based content management systems mentioned above continue to suffer from a number of limitations in relation to accuracy, efficiency, and functionality. To illustrate, many remote-based content management systems provide generic preview icons (e.g., thumbnails) that fail to provide an accurate indication of content items stored on a client device. Indeed, most client devices provide graphical user interfaces that display a graphical representation of file contents. However, because partial content items do not include data stored on the client device, conventional remote-based content management systems cannot generate corresponding thumbnails. Rather, the client device displays generic icons, which can confuse users and lead to inaccurate selections of digital content items.

Some recent remote-based content management systems have introduced client-side interfaces that provide thumbnails to client devices upon request for the partial content items. These systems, however, suffer from significant deficiencies in efficiency and time. For example, upon receiving a request for a thumbnail for a partial content item, remote-based content management systems retrieve the thumbnail from the remote server (i.e., a server that stores the full digital content item). This exchange between the client device and the remote server, however, takes multiple seconds due to network latency. Further, because most client devices are programmed to serially request thumbnails for partial content items, providing multiple thumbnails to the client device can takes minutes, as each subsequent request waits for the completion of the previous request. This process inefficiently wastes computing resources and time as each request requires network overhead and causes latency in exchange for a single thumbnail.

These efficiency problems are exacerbated by the rigidity of remote-based content management systems. For instance, conventional remote-based content management systems do not have access to content items displayed in a particular folder (as this information is managed and retained by the operating system of the client device). Accordingly, the remote-based content management systems mentioned above are inflexible in that they cannot identify the partial content items actually displayed in a folder until the client device individually requests each missing thumbnail.

Thus, there are several disadvantages with regard to conventional and recent remote-based content management systems.

SUMMARY

Embodiments of the present disclosure provide benefits and/or solve one or more of the foregoing or other problems in the art with systems, methods, and computer-readable media for prefetching thumbnails from remote servers to client devices for placeholder files based on a dynamic determination of file display criteria. For example, the disclosed systems can intelligently predict files in a folder for which the client device will next request thumbnails. In particular, the disclosed systems can predict, based on previous requests, a sort order for the current folder (i.e., a sorted directory) and predict files that the client device will request based on the sort order. Further, the disclosed systems can prefetch thumbnails for the predicted files from a remote source in bulk prior to the client device making the thumbnail requests. In this manner, the disclosed systems can quickly provide the client device with requested thumbnails while also significantly reducing computations and network latency issues that encumber conventional systems.

To illustrate, in one or more embodiments, the disclosed systems detect thumbnail requests from a client device for one or more files within a folder. In response, the disclosed systems can obtain a listing of files in the folder and generate sorted directories (i.e., lists that sort the files in the folder into various arrangements). Utilizing the thumbnail requests, the disclosed systems can select the sorted directory (e.g., by determining a distance between requested files in the generated sorted directories). Based on the selected sorted directory, the disclosed systems can predict which files in the folder the client device will next request as well as request thumbnails for all of the predicted files. Later, when the client device requests thumbnails for additional files in the folder, the disclosed systems can provide the requested thumbnails to the client device from a local cache (without the need to obtain the thumbnails from a remote source).

Additional features and advantages of the present disclosure will be set forth in the description that follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 5A-5C illustrate example implementations of predicting the files in a folder for which a client device will request thumbnails in accordance with one or more embodiments

DETAILED DESCRIPTION

Figure 1:
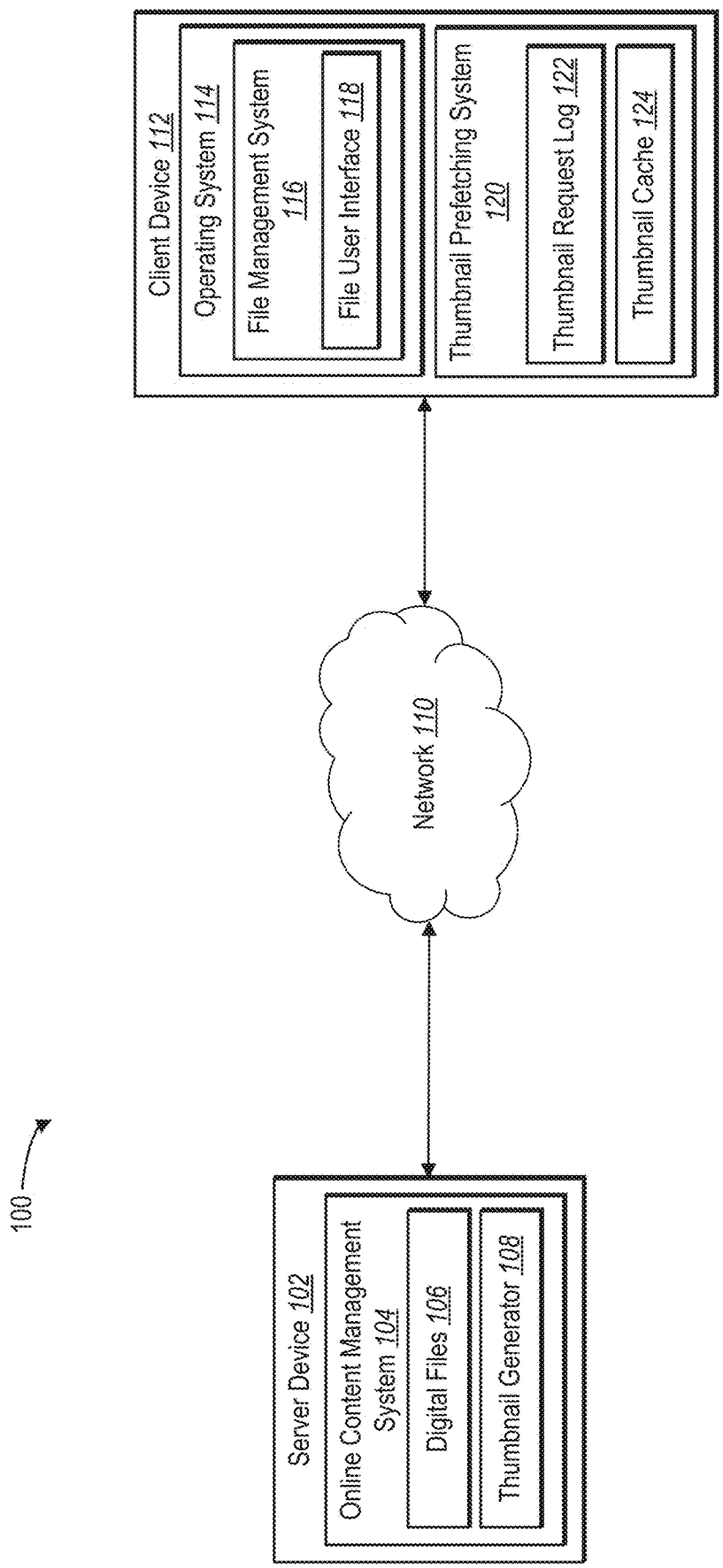
FIG. 1 illustrates a schematic diagram of an example environment in which the thumbnail prefetching system can operate in accordance with one or more embodiments.

The present disclosure describes one or more embodiments of a thumbnail prefetching system that facilitates predicting and prefetching thumbnails from a remote server before the client device requests the thumbnails based on a dynamic determination of file display criteria. For example, the thumbnail prefetching system utilizes previous thumbnail requests to dynamically predict a sort order for a current file. The thumbnail prefetching system can then predict the thumbnails the client device will next request based on the predicted sort order and efficiently prefetch the predicted thumbnails. In this manner, the thumbnail prefetching system can provide thumbnails subsequently requested by the client device significantly faster than conventional systems without unnecessarily burdening the client device by downloading excessive information.

To illustrate, in one or more embodiments, the thumbnail prefetching system detects, from a client device, two thumbnail requests that each request a thumbnail for a file (e.g., a first file and a second file) included in a folder. In response to receiving the thumbnail requests, the thumbnail prefetching system can access the folder directory to identify files in the folder and generate sorted directories (e.g., file lists) that arrange the files in the folder according to various sort orders. In addition, the thumbnail prefetching system can compare distances between the first file and the second file within each of the sorted directories to select a sorted directory. Utilizing the selected sorted directory, the thumbnail prefetching system can predict an additional file for which the client device will subsequently request a thumbnail. Further, the thumbnail prefetching system can retrieve the predicted thumbnail. Then, when the client device requests a thumbnail for the additional file in the folder, the thumbnail prefetching system can provide the additional thumbnail from a local cache (rather than retrieving the thumbnails from the remote source).

As mentioned above, the thumbnail prefetching system can detect thumbnail requests for files in a folder. For example, in one or more embodiments, the client device displays a folder that shows a number of files within a graphical user interface, including placeholder files. In various embodiments, placeholder files contain metadata labels, while the actual data of the file is stored at a remote server. In many embodiments, the client device (e.g., the operating system) is unable to generate thumbnails for these placeholder files. Rather, the operating system displays placeholders in the folder as generic icons until the operating system can obtain a thumbnail from outside of the operating system. Accordingly, in one or more embodiments, the operating system requests thumbnails for the placeholder files from the thumbnail prefetching system.

As mentioned above, the thumbnail prefetching system utilizes the thumbnail requests to prefetch thumbnails for files in a folder prior to the operating system requesting them. Thus, in one or more embodiments, upon receiving the thumbnail requests, the thumbnail prefetching system can determine a sorted directory. In particular, while the thumbnail prefetching system can access a listing of files included in the folder, the thumbnail prefetching system generally does not have access to the arrangement of the files (from the operating system) for which files in the folder are currently visible (e.g., the current scroll position and file sort order). As such, the thumbnail prefetching system uses the thumbnail requests to determine the sort order displayed to the user.

To elaborate, in one or more embodiments, the thumbnail prefetching system generates sorted directories (e.g., lists of files in the folder) that arrange the files in the folder directory (including the first and second file) in various sort orders (e.g., sorting by name, size, modification date, type, etc.). For each of the generated sorted directories, the thumbnail prefetching system can determine the distance between the first file and the second file in the corresponding arrangements. Then, based on comparing the distances among sorted directories, the thumbnail prefetching system can identify the sorted directory that most likely matches the folder as displayed by the client device.

In addition, as mentioned above, the thumbnail prefetching system can identify one or more additional files based on the sorted directory. For example, the thumbnail prefetching system can utilize the identified sorted directory and the position of the last requested file to predict additional files for which the client device will next request thumbnails. To illustrate, in various embodiments, the thumbnail prefetching system identifies the files surrounding and adjacent to the last requested file in the selected sorted directory as the additional files.

Moreover, the thumbnail prefetching system can retrieve thumbnails for the identified files. For example, in one or more embodiments, the thumbnail prefetching system retrieves the thumbnail (from the server device) for the last file requested by the client device along with retrieving thumbnails for each of the identified additional files in the folder (e.g., the additional files adjacent to the last requested file in the selected sorted directory). Indeed, the thumbnail prefetching system can retrieve (from the server) the thumbnail currently requested by the operating system (e.g., the second thumbnail request) as well as thumbnails for the additional files at the same time in bulk (e.g., transmitted together in a single data package).

As mentioned above, the thumbnail prefetching system can fulfill future thumbnail requests from the client device with prefetched thumbnails. For example, upon retrieving the thumbnails from the remote server, in various embodiments, the thumbnail prefetching system provides the thumbnail for the second file to the operating system and stores the retrieved thumbnails for the additional files in a local cache. Then, when the thumbnail prefetching system detects an additional thumbnail request, the thumbnail prefetching system fulfils the additional thumbnail request by providing the corresponding thumbnail stored in the local cache, rather than sending an additional retrieval request to the remote server device.

The thumbnail prefetching system provides numerous advantages and benefits over conventional systems and methods. For example, the thumbnail prefetching system improves accuracy relative to conventional remote-based content management systems. For instance, in contrast to conventional remote-based content management systems, the thumbnail prefetching system provides thumbnails that accurately depict the contents of placeholder files in a folder. In particular, the thumbnail prefetching system generates and/or prefetches thumbnails for placeholder files that do not include data stored on the client device. Accordingly, the thumbnail prefetching system can provide accurate thumbnails for placeholder files, reduce user confusion, and limit inaccurate selection of digital content items.

In addition, the thumbnail prefetching system improves computer functionality by reducing wasted computing resources, processing time, redundant overhead, and network latency. To illustrate, a folder that includes 50 visible placeholders previously required 50 separate retrieval requests back and forth from a remote server to retrieve each thumbnail requested by the operating system. In addition, each retrieval request cycle to the remote server lasted at least a second (often longer depending on network conditions) and required separate header data, network packaging, and separate payloads to and from the client device. Thus, for the folder with 50 visible placeholder files, conventional systems required over a minute of wait time to display every thumbnail.

In contrast, the thumbnail prefetching system can predict and retrieve multiple files in a single thumbnail request to the remote server. For example, if the thumbnail prefetching system retrieves 25 thumbnails per retrieval request, the thumbnail prefetching system can retrieve the 50 thumbnails in only 2 retrieval requests. Thus, the thumbnail prefetching system can display the 50 visible placeholder files in the folder in two seconds or less rather than causing a user to wait over a minute. Further, by utilizing the prefetched thumbnails, the thumbnail prefetching system can reduce user frustration, as the thumbnails in the folder populate around the same time.

In addition to significantly reducing the time needed to display thumbnails for placeholders on the client device, the thumbnail prefetching system reduces the computational resources needed to separately obtain each thumbnail requested by the client device. Indeed, by predicting and prefetching thumbnails in anticipation of a thumbnail request, the thumbnail prefetching system improves computational efficiency by eliminating the need to separately send and receive a retrieval request (e.g., including packing, unpacking, and processing at both the client device and the server device) for every thumbnail requested by the client device.

As another advantage, the thumbnail prefetching system provides increased flexibility over conventional and current remote-based content management systems. For example, the thumbnail prefetching system uses previous thumbnail requests to determine the placeholders that the client device is currently displaying. Further, as described below, the thumbnail prefetching system determines the arrangement and position of the visible placeholders within a folder. Indeed, the thumbnail prefetching system flexibly identifies the visible placeholders displayed in a folder and prefetches those thumbnails before the client device requests the missing thumbnails.

As illustrated by the foregoing discussion, the present disclosure utilizes a variety of terms to describe features and advantages of the thumbnail prefetching system. Additional detail is now provided regarding these and other terms used herein. For example, as used herein, the term "digital file" (or simply "file") refers to a collection of data. In particular, the term "file" includes a collection of data, such as a digital content item, that is treated as a single unit by a computer system. For instance, a file can include a collection of data within a computer system identifiable by a unique name and/or extension. A file can include a particular file type such as an image file, a text file, a spreadsheet, an audio file, a video file, or some other file type. Indeed, a file can include any of a large number of possible file types accessible by a computing device.

As used herein, the term "digital folder" (or simply "folder") refers to a representation of a collection of files. In particular, a folder refers to a representation of a collection of files within a hierarchy of digital files and folders. Indeed, a client device can maintain a number of folders organized together, where some folders and/or files are nested (e.g., located or contained) within other folders. A folder that is nested within another folder can be referred to as a "subfolder."

As mentioned, a client device can provide a graphical user interface that illustrates various files and folders. For example, in various embodiments, the client device utilizes an operating system application to present a thumbnail image that represents files within a folder. As used herein, the term "thumbnail image" (or simply "thumbnail") refers to a graphical representation or portrayal of a file. In particular, the term "thumbnail" refers to a graphical element that reflects and/or portrays the content of the file. For example, a thumbnail of an image can include a reduced version of the image. As another example, a thumbnail of a document can include a miniaturized version of one of the document pages. Thumbnails can range in size and detail, as described further below.

As mentioned above, a folder can include a placeholder file. As used herein, the term "placeholder file" (or simply "placeholder") refers to a file stored on a client device where some of the digital content corresponding to the file is stored on a remote server. In particular, the term "placeholder" refers to metadata that indicates the existence of a file (or folder) on a client device, where the full data for the file is stored on a remote server device. A placeholder for a file generally includes metadata about the file (e.g., name, size, tags, labels, type, and other attributes of the file and the file's data) such that the operating system (e.g., the file management system) can display the file's name along with a generic icon indicating the presence of a file in a folder. In many embodiments, the metadata for a placeholder does not include a thumbnail for the placeholder.

In addition, the term "sorted directory," as used herein, refers to an organization of files (e.g., files in a folder) in a particular arrangement based on an attribute of each file. For instance, a sorted directory can include a list, index, array, string, or table indicating an organization of files in a particular arrangement based on an attribute of each file. Thus, a sorted directory includes an arranged listing of files resulting from applying one or more sort orders to the files. For example, multiple sorted directories can be generated for a folder, including lists that arrange the files in the folder by file name, file size, date file modification, date file creation time, date added to folder, file type, tags, labels, or keywords. In various embodiments, a sorted directory associates a directory index with each arranged file that indicates the file's position (e.g., index number) in the sorted directory relative to the position of other files in the sorted directory.

Furthermore, the term "operating system" refers to software that manages a computing device. In particular, an operating system includes system software that manages computer hardware and software resources (e.g., to provide common services for computer programs). An operating system can perform a variety of functions, including input and output functions (e.g., detection and routing), memory allocation, intermediary functions between programs and computer hardware, task scheduling, and/or cost allocation. As outlined in greater detail below, an operating system can utilize hardware and software resources of a client device, via a set of instructions, to manage, organize, and display digital files and folders on a display (e.g., via a file management system). Example operating system include MICROSOFT WINDOWS, macOS, LINUX, ANDROID, and/or iOS.

Additional detail will now be provided regarding the synchronization system in relation to illustrative figures portraying example embodiments. For example, FIG. 1 illustrates schematic diagram of an environment 100 in which thumbnail prefetching system 120 can operate in accordance with one or more embodiments. As illustrated, environment 100 includes server device 102 and client device 112 connected by network 110.

As shown, server device 102 includes online content management system 104. Online content management system 104 manages a hierarchy of digital data (e.g., files) in a cloud-based environment (e.g., on server device 102) and provides access to digital data for a user on local client devices (e.g., client device 112). Examples of online content management systems include, but are not limited to, DROPBOX, GOOGLE DRIVE, and MICROSOFT ONEDRIVE.

Online content management system 104 includes digital files 106 and thumbnail generator 108. Digital files 106 can include full copies of files and folders for one or more users stored on server device 102. For instance digital files 106 can include digital content for placeholder files stored on client device 112 (and/or copies of other files stored on client device 112).

As shown, online content management system 104 also includes thumbnail generator 108. In one or more embodiments, thumbnail generator 108 creates and/or identifies thumbnails for files identified in retrieval calls from client device 112. For example, thumbnail generator 108 receives a request from client device 112 (e.g., thumbnail prefetching system 120) that identifies a user and one or more files for which a thumbnail is needed. Using the identifiers, thumbnail generator 108 locates full copies of the one or more files to identify and/or generate thumbnails for each requested file. Often, thumbnail generator 108 can identify and/or generate many of the requested thumbnails at the same time (e.g., using parallel processing threads). In this manner, thumbnail generator 108 can generate and/or identify multiple thumbnails in the time it takes to generate a single thumbnail.

Upon generating and/or identifying each of the requested thumbnails, in some embodiments, thumbnail generator 108 encapsulates the thumbnails into a single package and transmits the package to the requesting client device. Indeed, thumbnail generator 108 sends multiple thumbnails with the same amount of encapsulation data and packaging overhead as is needed to send a single thumbnail back to the client device.

As shown in FIG. 1, client device 112 includes operating system 114 and thumbnail prefetching system 120. In addition, operating system 114 includes file management system 116 having file user interface 118. As described previously, operating system 114 manages and displays files and folders to a user associated with client device 112. In various embodiments, operating system 114 utilizes file management system 116 to organize files and folders within client device 112. For example, file management system 116 enables a user to provide input to open, arrange, scroll within, resize, or otherwise navigate through folders and/or files on client device 112. Further, file management system 116 provides graphical user interfaces to display visual representations of files and folders on computing devices. Examples of file management systems include, but are not limited to WINDOWS EXPLORER, FINDER, NAUTILUS, DOLPHIN, XFE, or THUNAR.

As shown in FIG. 1, file management system 116 on client device 112 can integrate with online content management system 104. For example, online content management system 104 provides access to digital data to file management system 116 on local client devices. Indeed, online content management system 104 provides full or partial copies of folders and files that is remotely maintained by online content management system 104 on server device 102. For instance, online content management system 104 synchronizes files and folders on client device 112 that are accessible by file management system 116.

In addition, file management system 116 generates or surfaces thumbnails for files stored on client device 112. In particular, file management system 116 can access thumbnails stored on client device 112. In some circumstances, file management system 116 can also generate a file thumbnail based on accessing the file, analyzing the contents of the file, and creating a visual representation of the file based on the file contents (i.e., data). However, as mentioned above, file management system 116 cannot access or generate a thumbnail of a placeholder file that does not include a locally cached copy of a thumbnail (and/or a copy of the contents corresponding to the placeholder file stored on the remote server).

In the event that file management system 116 cannot generate a thumbnail for a file (e.g., a placeholder), file management system 116 can communicate with thumbnail prefetching system 120 to request a thumbnail for the file. Upon receiving the file's thumbnail, file management system 116 can associate the thumbnail with the file, and display the thumbnail, in place of a generic file icon within a folder when appropriate.

In one or more embodiments, file management system 116 utilizes file user interface 118 to display files and folders to the user. For example, file user interface 118 generates and updates the graphical user interface that displays files and folders to the user on client device 112. In addition, file user interface 118 can detect user inputs to arrange, modify, navigate through, or otherwise manipulate files or folders displayed to the user.

Thumbnail prefetching system 120, as described above, prefetches multiple thumbnails for files in a folder prior to file management system 116 requesting the prefetched thumbnails. Indeed, in many embodiments, thumbnail prefetching system 120 predicts which files in a folder file management system 116 will next request and retrieves these thumbnails from server device 102 in a reduced number of retrieval calls. As described above, thumbnail prefetching system 120 prefetches additional thumbnails upon receiving one or more thumbnail requests from file management system 116.

As shown, thumbnail prefetching system 120 includes thumbnail request log 122 and thumbnail cache 124. Thumbnail request log 122 can be a list, queue, database, or other file structure that maintains previous thumbnail requests from file management system 116. In some embodiments, thumbnail request log 122 holds the two previous thumbnail requests. In alternative embodiments, thumbnail request log 122 holds additional previous thumbnail requests. In various embodiments, thumbnail prefetching system 120 maintains thumbnail request log 122 for each folder. In alternative embodiments, thumbnail prefetching system 120 maintains fewer thumbnail request logs, such as a single thumbnail request log.

Thumbnail cache 124 can store one or more thumbnails prefetched from server device 102. For example, thumbnail cache 124 is memory hash table on client device 112 associated with thumbnail prefetching system 120 that stores prefetched thumbnails as hash values. In one or more embodiments, thumbnail cache 124 is a temporary local cache associated with thumbnail prefetching system 120. For instance, thumbnails in thumbnail cache 124 expire and are evicted (e.g., removed) after a period of inactivity. For example, if file management system 116 has not requested a thumbnail for a folder in over ten minutes, thumbnail cache 124 removes all prefetched thumbnails associated with the folder.

In alternative embodiments, thumbnail cache 124 is more persistent. For example, thumbnail cache 124 maintains prefetched thumbnails for each placeholder until file management system 116 requests the thumbnail. In some embodiments, thumbnail cache 124 stores thumbnails up to a maximum size constraint (e.g., the total size of thumbnail cache 124 is less than 10 MB). In these embodiments, thumbnail cache 124 may evict the oldest prefetched thumbnails or thumbnails belonging to the folder having the oldest thumbnail request when the size constraint is exceeded.

Although FIG. 1 illustrates a minimum number and arrangement of devices, environment 100 can include any number of devices, including any number of server devices 102 and/or client devices 112. Moreover, in some embodiments, one or more of client devices 112 may directly communicate with server device 102 via an alternative communication network, bypassing network 110.

In addition, the devices of environment 100 may refer to various types of computing devices. For example, one or more of the devices (e.g., server devices 102) may include a non-mobile device such as a desktop computer, a server, or another type of computing device. Additionally, or alternatively, one or more of the devices (e.g., client device 112) may include a mobile device such as a wireless communication device, a mobile telephone, a smartphone, a PDA, a tablet, a handheld device, or a laptop. Additional detail with regard to different types of computing devices is described in reference to FIG. 9.

As mentioned above, server device 102 and client device 112 communicate via network 110. Network 110 may include one or more multiple networks and may use one or more communication platforms or technologies suitable for transmitting data. In one or more embodiments, network 110 includes the Internet or World Wide Web. In addition, or as an alternative, network 110 can include various other types of networks that use various communication technologies and protocols. Additional details related to network 110 are explained below in reference to FIG. 9.

Similarly, although environment 100 of FIG. 1 is depicted as having various components, environment 100 may have additional or alternative components. For example, thumbnail prefetching system 120 can be implemented on multiple computing devices. In particular, and as described above, thumbnail prefetching system 120 may be implemented in whole by the server device 102 or thumbnail prefetching system 120 may be implemented in whole by client device 112. Alternatively, thumbnail prefetching system 120 may be implemented across multiple devices or components (e.g., utilizing server device 102 and client device 112).

To elaborate, in various embodiments, server device 102 can also include all, or a portion of, thumbnail prefetching system 120 (further described below), such as within online content management system 104. For instance, when located on server device 102, thumbnail prefetching system 120 includes an application running on server device 102 or a portion of a software application that can be downloaded to client device 112. For example, thumbnail prefetching system 120 includes a networking application allowing client device 102 to interact (e.g., provide thumbnail requests) via network 110. To illustrate, in some embodiments, server device 102 receives thumbnail request(s) from client device 112, identifies additional files in the same folder as the requested file(s), generates thumbnails for the requested file(s) and the additional files, and provides the generated thumbnails in a single package to client device 112.

The components 104-108 and 114-124 can include software, hardware, or both. For example, the components 104-108 and 114-124 include one or more instructions stored on a computer-readable storage medium and executable by processors of one or more computing devices, such as a client device or server device. When executed by the one or more processors, the computer-executable instructions of server device 102 and/or client device 112 can cause the computing device(s) to perform the feature learning methods described herein. Alternatively, the components 104-108 and 114-124 can include hardware, such as a special-purpose processing device to perform a certain function or group of functions. Alternatively, the components 104-108 and 114-124 can include a combination of computer-executable instructions and hardware.

Furthermore, the components 104-108 and 114-124 are, for example, implemented as one or more operating systems, as one or more stand-alone applications, as one or more modules of an application, as one or more plug-ins, as one or more library functions or functions called by other applications, and/or as a cloud computing model. Thus, the components 104-108 and 114-124 can be implemented as a stand-alone application, such as a desktop or mobile application. Furthermore, the components 104-108 and 114-124 can be implemented as one or more web-based applications hosted on a remote server. The components 104-108 and 114-124 can also be implemented in a suite of mobile device applications or "apps." To illustrate, the components 104-108 and 114-124 can be implemented in an application, including but not limited to DROPBOX®.

Figure 2:
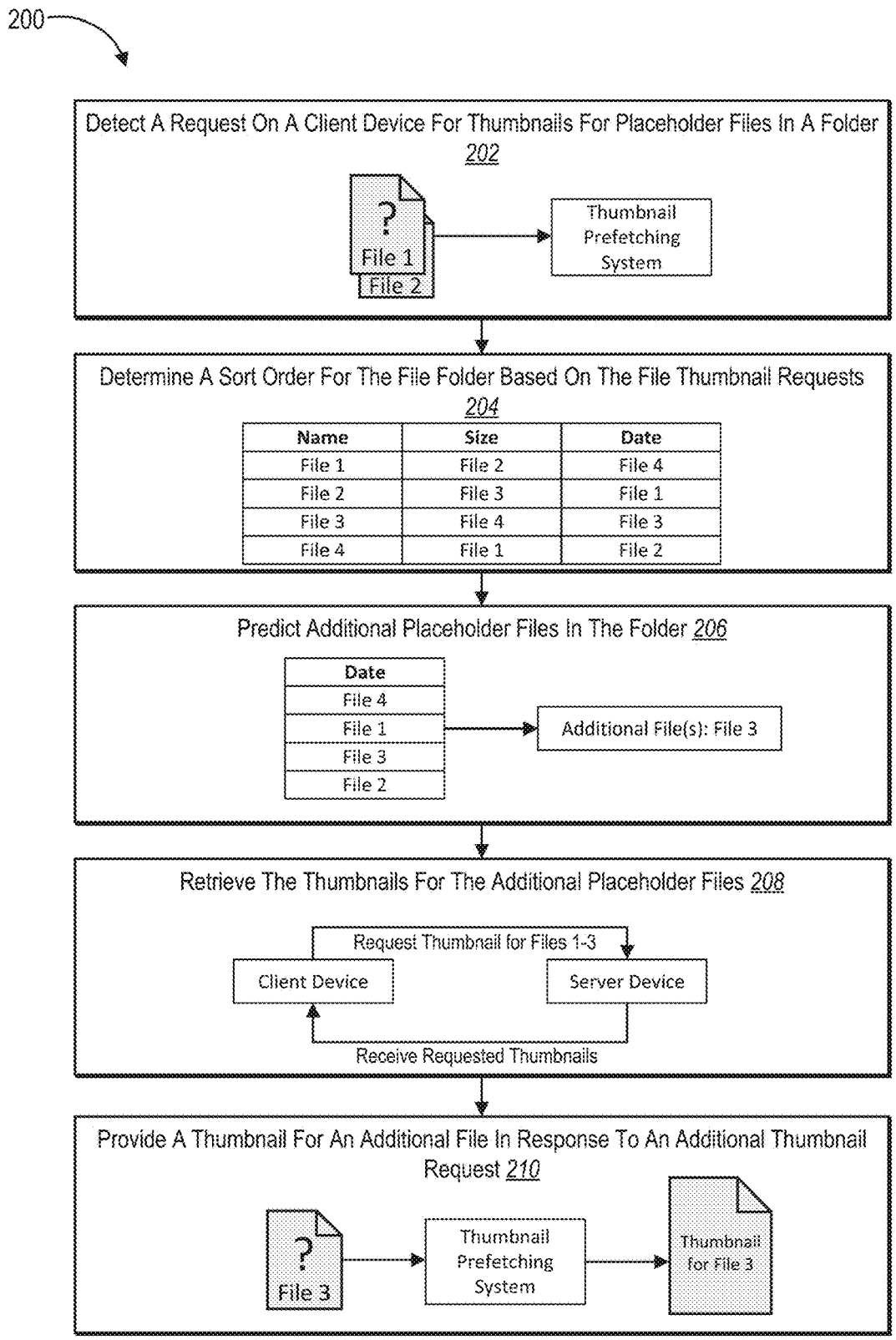
FIG. 2 illustrates a schematic diagram illustrating prefetching thumbnails for files in a folder in accordance with one or more embodiments.

As mentioned, thumbnail prefetching system 120 can predict and obtain thumbnails from a remote server to anticipate future thumbnail requests from an operating system. For example, FIG. 2 illustrates a schematic diagram of a series of acts 200 for prefetching thumbnails for files in a folder in accordance with one or more embodiments. In particular, series of acts 200 corresponds to acts performed by thumbnail prefetching system 120.

As shown, series of acts 200 includes act 202 of detecting a request on a client device for thumbnails for placeholder files in a folder. For example, client device displays a folder to a user that is missing thumbnails for multiple files (e.g., placeholders) for which the client device is unable to generate thumbnails. Accordingly, the client device (e.g., via the operating system and the file management system) requests thumbnails for the placeholders. In response, thumbnail prefetching system 120 detects the thumbnail requests for at least two or more of the placeholders.

In addition, series of acts 200 includes act 204 of determining a sort order for the file folder. For instance, thumbnail prefetching system 120 arranges the files in the folder according to various sort orders in connection with detecting the thumbnail requests. For example, thumbnail prefetching system 120 arranges the files according to name, size, date, type, tag, etc. to generate sorted directories. Thumbnail prefetching system 120 then predicts which sort order corresponds to the file folder by determining which sorted directory (e.g., ordered listing of files in the folder) has the smallest distance between the previously requested files.

Series of acts 200 also includes act 206 of predicting additional placeholder files in the folder. In some embodiments, thumbnail prefetching system 120 identifies multiple placeholders in the folder having missing thumbnails (e.g., placeholders for which the client device has not requested thumbnails). In particular, and as described below, thumbnail prefetching system 120 utilizes the last thumbnail requests from the client device and the predicted sort order to identify placeholders in the folder that the operating system will request next.

Further, series of acts 200 includes act 208 of retrieving the thumbnails for the additional placeholder files. Upon identifying one or more placeholders for which thumbnail requests are anticipated, thumbnail prefetching system 120 requests and obtains corresponding thumbnails from a remote server device (e.g., a remote storage device that has full copies of the identified files). In addition, thumbnail prefetching system 120 can store the thumbnails for the additional placeholders locally, either temporarily or persistently.

In addition, series of acts 200 includes act 210 of providing the thumbnails for the additional placeholder files in response to an additional thumbnail request. For example, thumbnail prefetching system 120 detects a new thumbnail request for a placeholder in the folder. In response, thumbnail prefetching system 120 determines that the requested thumbnail was retrieved and stored in a local cache (e.g., prefetched). Accordingly, thumbnail prefetching system 120 can directly provide the client device with the requested thumbnail without causing extra delay in retrieving the thumbnail from the remote server device after receiving the thumbnail request from the client device.

Figure 3A:
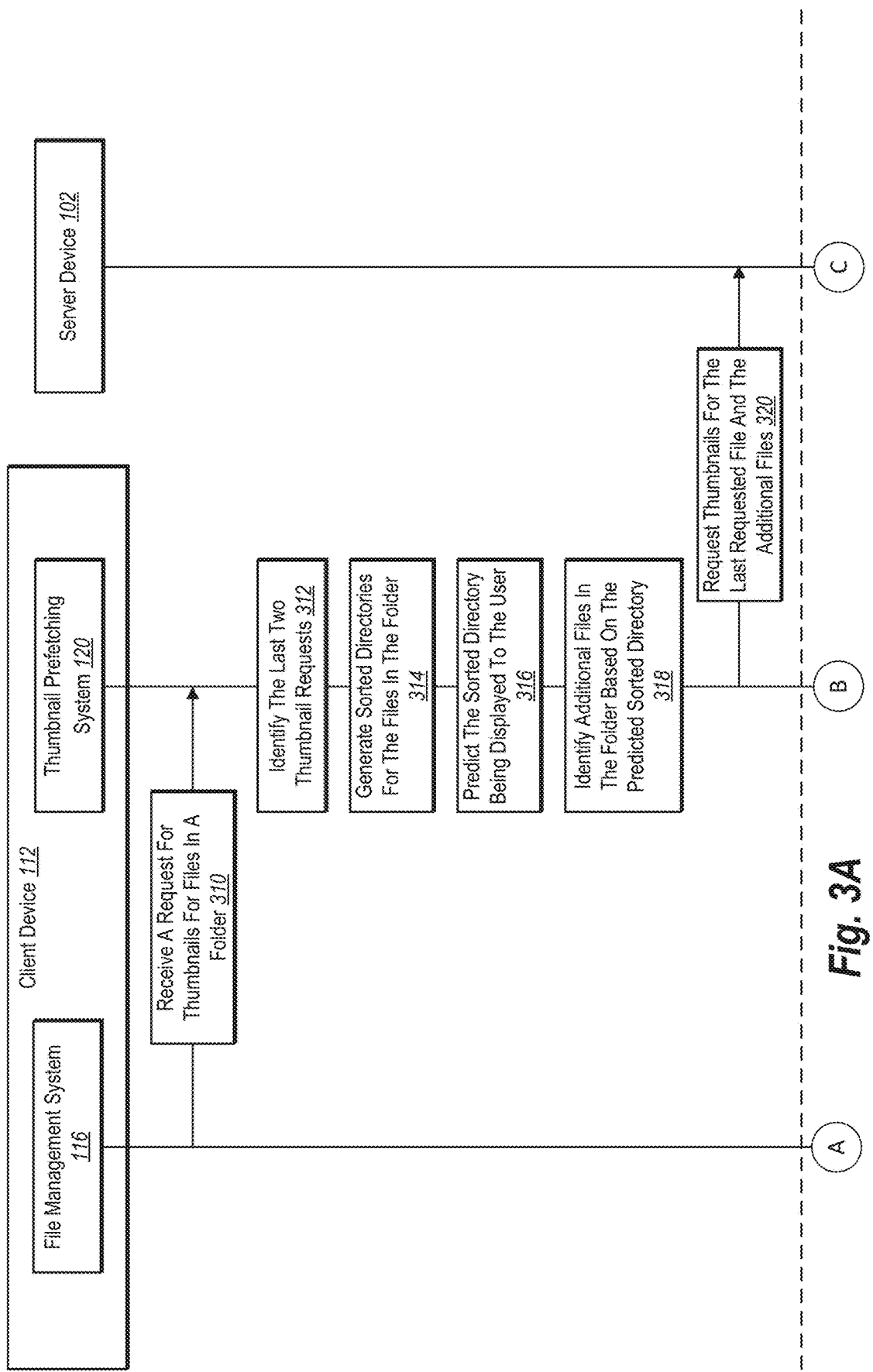
FIGS. 3A-3B illustrate an additional sequence diagram illustrating prefetching thumbnails for files in a folder in accordance with one or more embodiments.
Figure 3B:
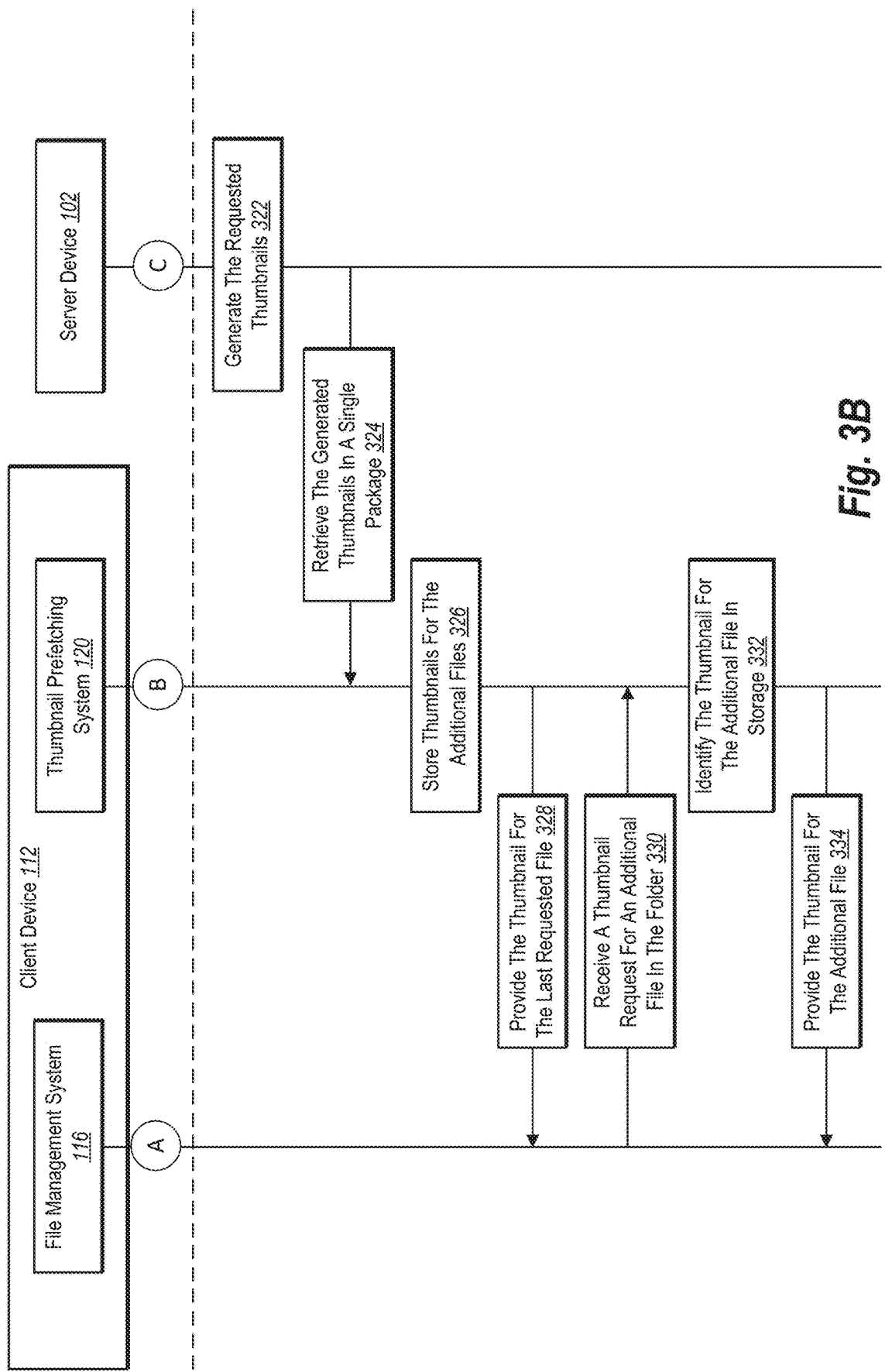

Turning now to the FIGS. 3A-3B, these figures illustrate a sequence flow diagram of prefetching thumbnails for files in a folder in accordance with one or more embodiments. In particular, FIGS. 3A-3B illustrate example interactions between client device 112 and server device 102. As shown, client device 112 includes file management system 116 and thumbnail prefetching system 120. As mentioned above, file management system 116 can represent operating system 114 of client device 112 that manages files on client device 112 as well as displays a graphical user interface files depicted as thumbnails within folders.

As shown in act 310 in FIG. 3A, thumbnail prefetching system 120 receives a request for thumbnails for files in a folder from file management system 116. In one or more embodiments, file management system 116 displays a graphical user interface that includes a folder having multiple files, where some of the files are placeholders with missing thumbnails. Indeed, as described above, file management system 116 cannot generate thumbnails from placeholders because placeholders lack sufficient data (e.g., lack a thumbnail image or digital contents of the placeholder files). Accordingly, file management system 116 detects that placeholders are associated with thumbnail prefetching system 120 and requests thumbnails for the placeholders from thumbnail prefetching system 120.

Upon receiving the request, as shown in act 312, thumbnail prefetching system 120 identifies the last two thumbnail requests for the folder. In one or more embodiments, thumbnail prefetching system 120 maintains a log of files for which file management system 116 has requested thumbnails. In some embodiments, the log includes two entries. For example, the log is a first-in-first-out (FIFO) queue that stores the last two files for which thumbnails were requested. In alternative embodiments, the log is larger and includes additional thumbnail requests.

In connection with detecting the thumbnail requests, thumbnail prefetching system 120 generates sorted directories (e.g., ordered listings) for files in the folder, as shown in step 314. Thumbnail prefetching system 120 can obtain a directory listing of files included from the folder. For example, thumbnail prefetching system 120 is part of online content management system that maintains a file listing for the folder. In various embodiments, thumbnail prefetching system 120 receives the file listing from file management system 116. In alternative embodiments, thumbnail prefetching system 120 obtains the file listing from an external source, such as server device 102.

Upon obtaining the file listing for the folder, thumbnail prefetching system 120 arranges the files and/or subfolders in the folder according to various sort orders. For example, thumbnail prefetching system 120 generates a separate list of the files in the folder (i.e., sorted directory), each arranged according to one of the sort orders. In this manner, the files can be ordered in different and/or unique arrangements as per the different sort orders. Examples of sorted directories for files in a folder are shown and further described with respect to FIG. 5A below.

As shown in act 316, thumbnail prefetching system 120 predicts (e.g., deduces or determines) the sorted directory being displayed to the user. In particular, thumbnail prefetching system 120 utilizes the previous thumbnail requests and sorted directories to determine which sort order file management system 116 is displaying to the user on client device 112. By predicting which sorted directory client device 112 is displaying to the user, thumbnail prefetching system 120 can better determine the files for which file management system 116 will next request thumbnails.

To illustrate, in one or more embodiments, thumbnail prefetching system 120 identifies the two files corresponding to the last two thumbnail requests in each of the sorted directories. Then, thumbnail prefetching system 120 compares the distance between the two files in each sorted directory to identify which sorted directory has the two files nearest to each other. Indeed, the sorted directory that has the shortest distance between the last two requested files will frequently match the arrangement of files being displayed to the user by client device 112. Additional description regarding predicting a sorted directory is provided below with respect to FIG. 5B.

In addition, thumbnail prefetching system 120 identifies additional files in the folder based on the predicted sorted directory, as act 318 illustrates. In some embodiments, predicting the sorted directory that matches the arrangement of the folder being displayed to the user on client device 112 enables thumbnail prefetching system 120 to identify the order of the files. In addition, predicting a matching sorted directory enables thumbnail prefetching system 120 to determine which files in the folder are visible to the user. Indeed, inasmuch as some folders include a large number of files that cannot all be visible at once, predicting the matching sorted directory allows the thumbnail prefetching system 120 to determine which files are in the current viewing window and most likely to be requested by the operating system.

To illustrate, in one or more embodiments thumbnail prefetching system 120 identifies the last requested file in the predicted sorted directory. Based on the position of the last requested file, thumbnail prefetching system 120 identifies additional files that are adjacent to the last requested file. For example, the thumbnail prefetching system 120 can identify the 25 files adjacent to the last requested file in the sorted directory. In some embodiments, thumbnail prefetching system 120 first determines if adjacent files are placeholders and/or if thumbnail prefetching system 120 has recently provided file management system 116 with a thumbnail for the file, as further described below. Additional detail regarding identifying additional files utilizing the predicted sorted directory is provided with respect to FIG. 5C below.

As shown in act 320, thumbnail prefetching system 120 requests thumbnails for the last requested file and the additional files. In particular, thumbnail prefetching system 120 sends a thumbnail retrieval request to server device 102 to have server device 102 generate (or identify) and return the thumbnail for the last file requested by file management system 116. The retrieval request also includes the request for thumbnails corresponding to each of the additional files (i.e., the files adjacent to the requested file according to the sort order). In one or more embodiments, the retrieval request includes a file identifier of the file for which a thumbnail is requested.

In response to the request from thumbnail prefetching system 120, server device 102 generates and/or identifies the requested thumbnails, as shown in act 322 in FIG. 3B. For example, server device 102 includes a full copy of the files in the folder and can quickly generate or access thumbnails. Then, as shown in act 324, thumbnail prefetching system 120 retrieves the generated thumbnails from server device 102 in a single package. In this manner, thumbnail prefetching system 120 significantly reduces the overhead and network latency from multiple exchanges down to a single exchange.

In some embodiments, server device 102 has pre-generated one or more of the requested thumbnails. In other embodiments, server device 102 employs parallel processes to generate the thumbnails for the additional files at or near the same time as generating the thumbnail for the last requested file. Thus, the delay to wait for the additional thumbnails is minimized such that the time from requesting to receiving a single thumbnail is approximate to that of requesting and receiving multiple thumbnails, when all of the thumbnails are sent together in a single package.

As shown in act 326, thumbnail prefetching system 120 stores thumbnails for the additional files. In one or more embodiments, thumbnail prefetching system 120 stores the thumbnails for the additional files in a local and/or temporary cache. For example, thumbnail prefetching system 120 stores the thumbnails in a cache that expires at ten minutes from the last thumbnail request for the folder. In alternative embodiments, as described above (e.g., in relation to FIG. 1), thumbnail prefetching system 120 stores the additional thumbnails more persistently.

In addition, as shown in act 328, thumbnail prefetching system 120 provides the thumbnail for the last requested file to file management system 116. Subsequently, as illustrated in act 330, thumbnail prefetching system 120 receives a thumbnail request for an additional file in the folder. For example, file management system 116 requests the thumbnail for another visible file in the folder that is missing a thumbnail. Often the next thumbnail request is for a file that is close to the file of the last fulfilled thumbnail request.

As shown in act 332, thumbnail prefetching system 120 identifies the thumbnail for the additional file in storage. For example, thumbnail prefetching system 120 matches the file identifier to one of the prefetched thumbnails stored in the temporary cache. Further, thumbnail prefetching system 120 provides the thumbnail for the additional file to file management system 116, as shown in act 334. Indeed, because the thumbnail for the other file is prefetched, thumbnail prefetching system 120 need not send another retrieval request to server device 102 nor wait for server device 102 to provide a separate response.

In various embodiments, thumbnail prefetching system 120 repeats acts 328-334 to immediately and directly fulfill thumbnail requests from file management system 116 by providing prefetched thumbnails. Thus, even if file management system 116 requests thumbnails for files in a serial manner, thumbnail prefetching system 120 can provide cached thumbnails (near-instantaneously) to file management system 116 such that client device 112 is able to render thumbnails in the folder in real-time or near-real-time.

In some embodiments, file management system 116 requests a thumbnail for another folder whose thumbnail is not in the storage cache (or for files in a different folder). When this occurs, thumbnail prefetching system 120 can repeat acts 310-328. Indeed, thumbnail prefetching system 120 can repeat the actions described above to identify and retrieve another set of thumbnails for files in the folder for which file management system 116 likely will request thumbnails. In this manner, even if thumbnail prefetching system 120 makes multiple calls (e.g., thumbnail retrievals) to server device 102, the overall number of calls is greatly reduced by implementation of thumbnail prefetching system 120.

In one or more embodiments, thumbnail prefetching system 120 utilizes additional file requests to improve prediction of the sorted directory. For example, after receiving two thumbnail requests, thumbnail prefetching system 120 implements the actions described above. When additional thumbnail requests are detected from file management system 116 for additional files in the folder, thumbnail prefetching system 120 utilizes the identifiers of the additional files to more accurately predict the sorted directory being displayed to the user. For instance, thumbnail prefetching system 120 determines mean distances between each of the requested files within each sorted directory, then selects the sorted directory having the smallest mean distance as the predicted sorted directory.

Figure 4:
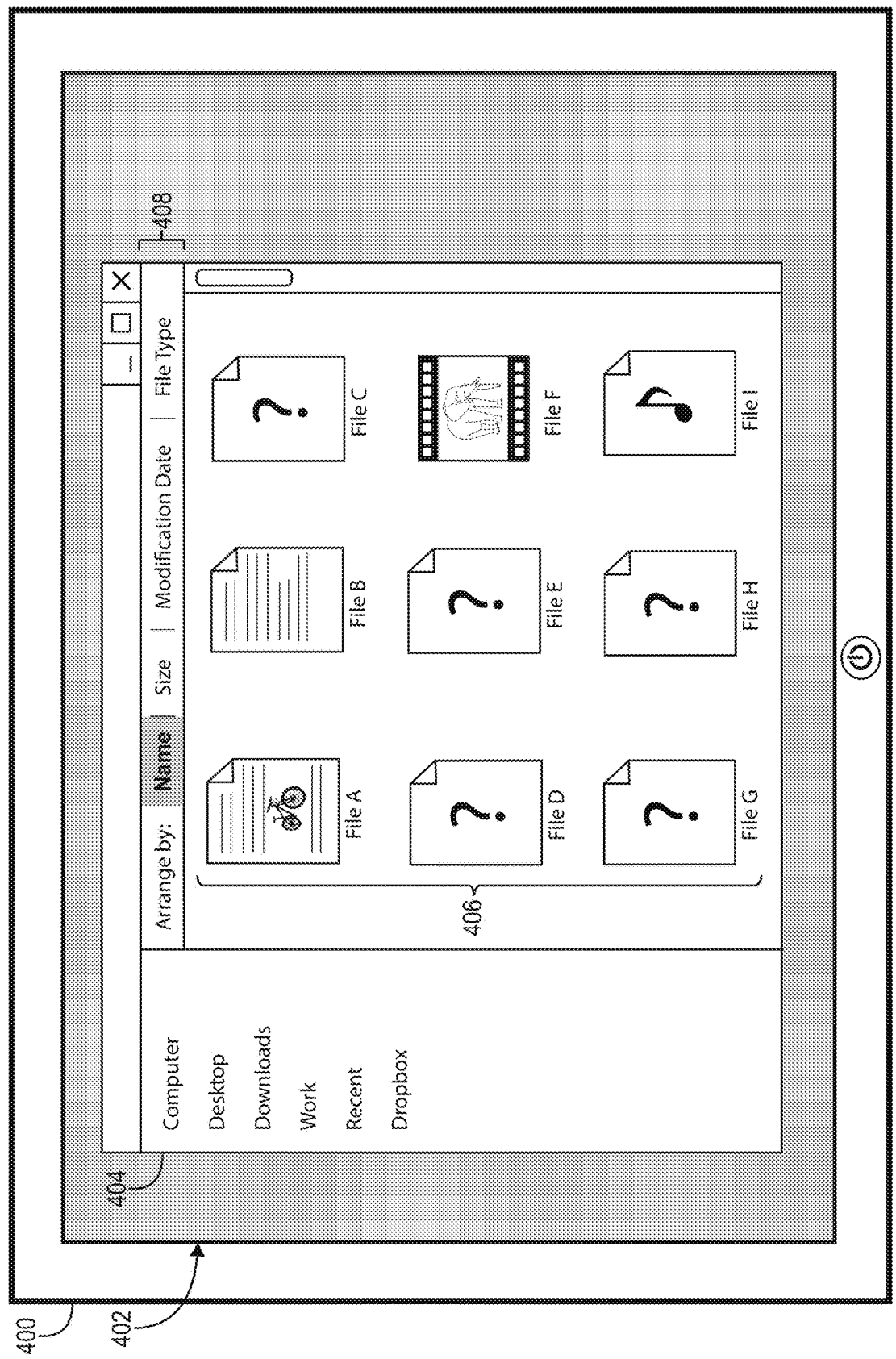
FIG. 4 illustrates an example client device having a user interface of a folder that includes placeholder files with missing thumbnails in accordance with one or more embodiments.

Turning now to FIG. 4, additional detail is provided regarding an example client device displaying thumbnails in a folder within a graphical user interface in accordance with one or more embodiments. In particular, FIG. 4 illustrates client device 400 displaying graphical user interface 402 that includes folder 404 and files 406. As shown, a number of files are shown as representative thumbnails, such as File A, File B, and File F. For example, file management system 116 generates thumbnails for these files as described above. Alternatively, file management system 116 obtains thumbnails for these files from a thumbnail prefetching system (e.g., thumbnail prefetching system 120).

In addition, folder 404 includes additional files represented by generic icons, such as File C, File D, File E, File G, File H, and File I. For example, the generic icon is represented by a question mark symbol, but other generic icons may be displayed. In various embodiments, these files are placeholders. Thus, the file management system is unable to generate thumbnails from these placeholders because they do not include file data. Instead, these placeholders include metadata that enables the operating system (e.g., a file management system) to display indications of files within folder 404.

As shown in FIG. 4, files 406 in folder 404 are sorted by "name." To illustrate, folder 404 includes various sort order options 408 for which a user associated with client device 400 can select. As shown, sort order options 408 include a sort order by name, a sort order by size (e.g., file size), a sort order by modification date, and a sort order by file type. Additional and/or combinations of sort orders are also possible. Upon a user selecting a sort order options from sort order options 408, folder 404 updates to show files 406 in the preferred arrangement. As mentioned above, thumbnail prefetching system 120 does not have access to, nor does the operating system provide, the selected sort order of files 406 in folder 404 to thumbnail prefetching system 120.

As mentioned above, thumbnail prefetching system 120 does not have access to which files 406 in folder 404 are currently displayed within graphical user interface 402. For example, when user input causes file management system 116 to display different files within folder 404 (e.g., based on a user expanding the size of folder 404 or moving file locations within folder 404), file management system 116 does not indicate the change to thumbnail prefetching system 120. Rather, thumbnail prefetching system 120 identifies a change in visible files when a new thumbnail request is detected from file management system 116 (e.g., when additional placeholders have been made visible in folder 404 and file management system 116 cannot generate thumbnails for those files).

As mentioned above, file management system 116 attempts to replace generic icons by serially (e.g., one-by-one) requesting the thumbnails from thumbnail prefetching system 120. In particular, file management system 116 identifies a first visible file missing a thumbnail (i.e., File D) and further identifies that the file is a placeholder associated with thumbnail prefetching system 120 (e.g., based on the metadata of the placeholder). In response, file management system 116 provides a first thumbnail request to thumbnail prefetching system 120, which thumbnail prefetching system 120 retrieves.

Upon receiving the thumbnail for the first visible file missing a thumbnail (i.e., File D), the file management system identifies a second visible file missing a thumbnail (i.e., File E) and requests the corresponding thumbnail from thumbnail prefetching system 120. Based on receiving the second thumbnail request, thumbnail prefetching system 120 can obtain the thumbnail for the second file as well as prefetch thumbnails for additional placeholders in folder 404.

As mentioned above, upon receiving at least two thumbnail requests, thumbnail prefetching system 120 can predict the files in a folder for which the file management system will next request thumbnails. As part of the prediction process, thumbnail prefetching system 120 generates various sorted directories. To illustrate, FIG. 5A shows a table of various sorted directories 500 (e.g., lists of files ordered in various arrangements).

In particular, FIG. 5A illustrates four sorted directories 500 including a directory sorted by name 502, a directory sorted by size 504 (e.g., file size indicated by metadata or size used on client device 400), a directory sorted by modification date 506, and a directory sorted by file type 508. Additional and/or combinations of sorted directories are also possible (e.g., sorted by tag, attribute, creation date, size then name, type then size then name, etc.) The sorted directories 500 correspond to sort order options 408 shown in FIG. 4. Likewise, the files shown in FIG. 5A correspond to files 406 visible in folder 404 shown in FIG. 4.

To generate a sorted directory, in various embodiments, thumbnail prefetching system 120 first obtains a directory listing of the files in a folder. For example, in one or more embodiments, as described above, thumbnail prefetching system 120 is part of an online content management system, which maintains a directory listing of the files in the folder. In various embodiments, thumbnail prefetching system 120 receives the file listing from file management system 116 (i.e., from operating system 114).

Utilizing the directory listing, in some embodiments, thumbnail prefetching system 120 generates each of the sorted directories 500, listing the files in the folder according to a corresponding sort order. As shown, the directory sorted by name 502 arranges the files in alphabetical order. The directory sorted by size 504 arranges the files from largest to smallest file size. The directory sorted by modification date 506 arranges the files from most recent to least recent modification date of the file. The directory sorted by file type 508 arranges the files first by file type (where file type is arranged alphabetically), then alphabetically within each file type.

In one or more embodiments, thumbnail prefetching system 120 generates sorted directories that only include placeholders while excluding other files and/or folders. For example, in some embodiments, thumbnail prefetching system 120 maintains and/or accesses a record indicating which files in a folder are placeholders. In other embodiments, thumbnail prefetching system 120 determines which of the files in a folder are placeholders. In one example, thumbnail prefetching system 120 identifies all of the files in a folder having little to no stored bytes on client device 400 compared to the size of the file indicated by the file's metadata. In another example, thumbnail prefetching system 120 determines whether the data of each file is cached on the client device.

In additional embodiments, thumbnail prefetching system 120 can generate additional sorted directories that accommodate folders that include both files and folders. For example, thumbnail prefetching system 120 sorts files and folders separately based on a first sort order in a first sort directory as well as sorts the files and folders together based on the first sort order in a second sort directory. Overall, thumbnail prefetching system 120 can generate numerous sorted directories 500 as generating sorted directories is computationally inexpensive and can occur nearly instantaneously. In some embodiments, thumbnail prefetching system 120 has pre-generated sort order lists for each folder.

Figure 5B:
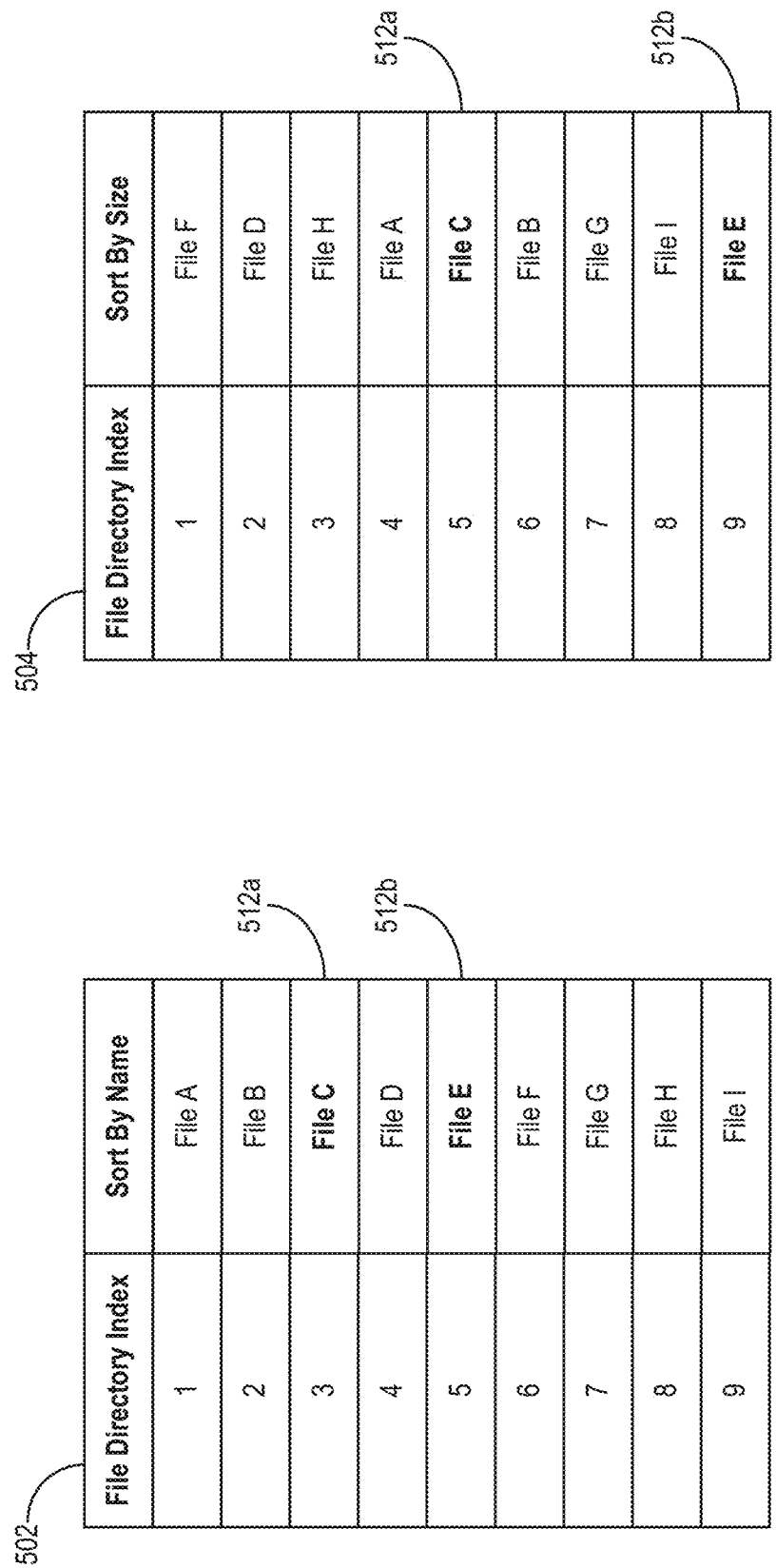

As mentioned previously, thumbnail prefetching system 120 can utilize the last two (or more) thumbnail requests to determine the sort order arrangement that a client device (e.g., client device 400) is displaying to the user. To illustrate, FIG. 5B shows thumbnail request queue 510 along with two of the sorted directories 500 (e.g., directory sorted by name 502 and directory sorted by size 504). For simplicity, only two of sorted directories 500 are shown and described with respect to FIG. 5B.

As shown, thumbnail request queue 510 includes the last two requested thumbnails, which include first thumbnail request 512*a* for File C and second thumbnail request 512*b* for File E. As mentioned above, thumbnail request queue 510 can include additional thumbnail requests from the file management system previously detected by thumbnail prefetching system 120. For example, thumbnail request queue 510 can include three, four, or more of the last detected thumbnail requests from the file management system.

In one or more embodiments, thumbnail prefetching system 120 identifies the positions of the files corresponding to the last two thumbnail requests in each of the sorted directories. To illustrate, thumbnail prefetching system 120 locates the position of first thumbnail request 512*a* (File C) and second thumbnail request 512*b* for File E in both directory sorted by name 502 and directory sorted by size 504. Based on the identified positions, thumbnail prefetching system 120 can compare distances between the two positions in each of the sorted directories and select the sorted directory having the smaller distance between the two positions.

More particularly, in one or more embodiments, thumbnail prefetching system 120 can determine the distance between the two positions in a sorted directory based on file indexes. To illustrate, upon arranging the files by name in directory sorted by name 502, File C (i.e., first thumbnail request 512*a*) has a file index of 3 and File E (second thumbnail request 512*b*) has a file index of 5. Thus, the distance between the positions (e.g., file indexes) of these files is two (e.g., 5-3). In a similar manner, thumbnail prefetching system 120 determines that the distance between first thumbnail request 512*a* and second thumbnail request 512*b* in directory sorted by size 504 is 4 (e.g., 9-5).

Then, comparing the two distances, thumbnail prefetching system 120 determines that first thumbnail request 512*a* and second thumbnail request 512*b* are located closer to one another in directory sorted by name 502 (e.g., a distance of 2) than in directory sorted by size 504 (e.g., a distance of 4). Thumbnail prefetching system 120 can compare distances across all of sorted directories 500 to determine which sorted directory has first thumbnail request 512*a* and second thumbnail request 512*b* closest to each other.

In general, by identifying the sorted directory having the smallest distance between the last two thumbnails, thumbnail prefetching system 120 can deduct which folder arrangement is being displayed to the user at the client device. Indeed, when file management system 116 identifies a folder that includes multiple files missing thumbnails, file management system 116 does not always request corresponding thumbnails in a systematic manner. However, file management system 116 commonly requests thumbnails for files that are visible near each other. Thus, by identifying a sorted directory that has a small distance between files corresponding to the last two thumbnail request, thumbnail prefetching system 120 can deduce which folder arrangement is being displayed to the user at the client device.

In one or more embodiments, thumbnail prefetching system 120 may identify that two or more sorted directories share the same distance. Indeed, thumbnail prefetching system 120 can determine that two sorted directories each have a distance of 2. In these embodiments, thumbnail prefetching system 120 selects one of the two sorted directories from a prioritized sorted directory hierarchy. For example, in the case of ties in distance, thumbnail prefetching system 120 selects a sorted directory according to the following sorted directory hierarchy: name, size, modification date, creating date, file type. This sorted directory hierarchy is merely an example and other hierarchical orders may be utilized.

Further, in various embodiments, thumbnail prefetching system 120 can stop determining the distance between the position of files for the last two requested thumbnails in additional sorted directories when thumbnail prefetching system 120 identifies a distance of 1 in a sorted directory. Indeed, a distance of 1 indicates that the files of the last two requested thumbnails are adjacent to each other, which often indicates that thumbnail prefetching system 120 identified the sort order arrangement being displayed to the user. In addition, no other sorted directory (e.g., list of files in the folder) can have a smaller sort order. Further, in embodiments where the distances for the sorted directories are determined according to the sorted directory hierarchy (e.g., determine the distance for the sort order by name first, sort order by size second, etc.), identifying a distance of 1 in a sort order arrangement will trump any ties to lesser prioritized sort order arrangements also having a distance of 1.

Upon selecting a sorted directory, in various embodiments, thumbnail prefetching system 120 can identify additional files in the folder that thumbnail prefetching system 120 predicts will receive thumbnail requests from the file management system. To illustrate, FIG. 5C shows sorted directory by name 502 as the sorted directory selected by thumbnail prefetching system 120. FIG. 5C also includes first thumbnail request 512*a* and second thumbnail request 512*b* and selection range 514.

In one or more embodiments, thumbnail prefetching system 120 utilizes the position of the last selected thumbnail request (e.g., second thumbnail request 512*b* for File E) as a starting position to begin identifying the additional files. In alternative embodiments, thumbnail prefetching system 120 utilizes the position of the second to last thumbnail request (e.g., first thumbnail request 512*a* for File C) or a combination of the two (e.g., the average or middle position) as the starting location to identify additional files.

To illustrate, based on selecting the position of the file of the last selected thumbnail request (e.g., File Index 5 corresponding to File E) as the starting position, thumbnail prefetching system 120 can identify adjacent files in the selected sorted directory (e.g., ordered list) as the additional files. For example, in various embodiments, thumbnail prefetching system 120 adds and subtracts from the file index of the starting position to identify the file indexes of files to add to a group of additional files.

In some embodiments, thumbnail prefetching system 120 utilizes a selection range to identify which files in the folder to include in the additional files. To illustrate, FIG. 5C includes selection range 514. In one or more embodiments, selection range 514 includes identifying N additional files (e.g., N=24). For instance, selection range 514 includes identifying N/2 additional files above and N/2 additional files below the position of the file of the last thumbnail request.

As shown, selection range 514 includes three files to either direction of the position of the file of the last selected thumbnail request. Selection range 514 can be larger or smaller. For example, selection range 514 can include 25 files in the folder (including the file of the last selected thumbnail request). However, the selection range should be capped to prevent identifying too many additional files at one time.

In various embodiments, thumbnail prefetching system 120 may expand selection range 514 further in one direction than in the other direction. For example, thumbnail prefetching system 120 expands selection range 514 to include four files below the position of the file of the last selected thumbnail request and two files above. In another example, thumbnail prefetching system 120 expands selection range 514 to include five files below the position of the file of the last selected thumbnail request and one file above.

In some embodiments, thumbnail prefetching system 120 employs a machine-learning algorithm to determine how to expand selection range 514. For example, over time, thumbnail prefetching system 120 utilizes a machine-learning algorithm that determines how to expand selection range 514 around the position of the file of last selected thumbnail request based on the file management system providing subsequent thumbnail requests. In some embodiments, thumbnail prefetching system 120 utilizes one or more machine-learning algorithms that determines to expand selection range 514 based on the selected sorted order, the distance between the position of the last two thumbnail requests, or other metrics (e.g., cache hit rates, and/or cache sizes).

Thumbnail prefetching system 120 can identify files in the folder to exclude from the identified additional files. For example, in various embodiments, thumbnail prefetching system 120 omits files that have their thumbnails previously requested (e.g., File C which was obtained in connection with first thumbnail request 512*a*). In another example, thumbnail prefetching system 120 omits files that are non-placeholders. For instance, thumbnail prefetching system 120 omits files over a threshold size on the client device. Similarly, thumbnail prefetching system 120 can omit files for which thumbnails already exist in a local cache on the client device (e.g., already prefetched).

As mentioned above, in some embodiments, thumbnail prefetching system 120 maintains a list or database of placeholder files stored on a client device. The database can additionally or alternatively include whether (e.g., when) thumbnail prefetching system 120 has fulfilled a thumbnail request for the placeholder. In this manner, thumbnail prefetching system 120 can prevent requesting thumbnails for the same placeholder twice. In alternative embodiments, thumbnail prefetching system 120 does not verify if a placeholder corresponds to a prefetched thumbnail from a previous retrieval request.

As mentioned above, thumbnail prefetching system 120 can select N number of additional files, where N may be divided (equally or unequally) above and below the position of the file of the last thumbnail request. When thumbnail prefetching system 120 excludes one or more files in selection range 514 as described above, thumbnail prefetching system 120 can likewise expand the selection range 514 until N additional files are identified.

To illustrate, if thumbnail prefetching system 120 determines not to include File C in the additional files because the thumbnail for File C was previously provided to the file management system, thumbnail prefetching system 120 can expand selection range 514 shown in FIG. 5C up by one to include File A in File Index 1. Then, in additional embodiments, based on thumbnail prefetching system 120 determining that File A and File B are not placeholders and/or already have thumbnails (as shown in FIG. 4), thumbnail prefetching system 120 can further expand selection range 514 upwards. However, because File A is at the top of the directory sorted by name 502, thumbnail prefetching system 120 can instead expand selection range 514 downwards. Alternatively, thumbnail prefetching system 120 can stop expanding selection range 514 when the end of the directory sorted by name 502 is reached.

As just mentioned, in some embodiments, thumbnail prefetching system 120 keeps searching outward from the position of the file of the last thumbnail request until N number of additional files are identified. In alternative embodiments, thumbnail prefetching system 120 stops searching for additional files when one or more conditions are met. For example, if thumbnail prefetching system 120 inspected over 4N files and was not able to identify N placeholders adjacent to the position of the file of the last thumbnail request, thumbnail prefetching system 120 can return any identified additional files. For instance, the majority of adjacent files are not placeholders, but full files for which the file management system generates thumbnails. In another example, thumbnail prefetching system 120 may stop searching for additional adjacent files when a threshold time elapses (e.g., 0.5 seconds).

In various embodiments, thumbnail prefetching system 120 utilizes one or more constraints when identifying the additional files. For example, in some embodiments, thumbnail prefetching system 120 does not include placeholders that have a timestamp (e.g., creation date, modification date, added to folder date, added to file management system date, etc.) within a threshold time period. For example, if placeholders in a file were modified over a year ago, thumbnail prefetching system 120 does not include those files in the additional files for which to prefetch thumbnails because the likelihood that these files are already represented by thumbnails is high. Further, if a thumbnail is needed for this file, file management system 116 can directly request it.

In one or more embodiments, upon file management system 116 requesting a thumbnail for an older file, thumbnail prefetching system 120 can modify the threshold time period to extend to at least the date of the older file just requested. Indeed, by file management system 116 providing a thumbnail request for a file with a timestamp beyond the threshold time period to thumbnail prefetching system 120, file management system 116 signals that there may exist other placeholders in the folder with timestamp beyond the initial threshold time period that are missing thumbnails.

Upon identifying the additional files, thumbnail prefetching system 120 can send a request to server device 102 for the thumbnail of the file identified in the last thumbnail request from file management system 116 as well as for each of the thumbnails for the additional files. As described above, server device 102 can generate each of the thumbnails and provide them back to thumbnail prefetching system 120 in a single communication. Then, as file management system 116 provides additional thumbnail requests, thumbnail prefetching system 120 can retrieve the requested thumbnail from a local cache rather than requesting the thumbnail from the server device. When file management system 116 requests a thumbnail not located in the local cache, thumbnail prefetching system 120 can repeat the above process to retrieve the last requested thumbnail as well as additional thumbnails that file management system 116 is likely to request next.

Figure 6:
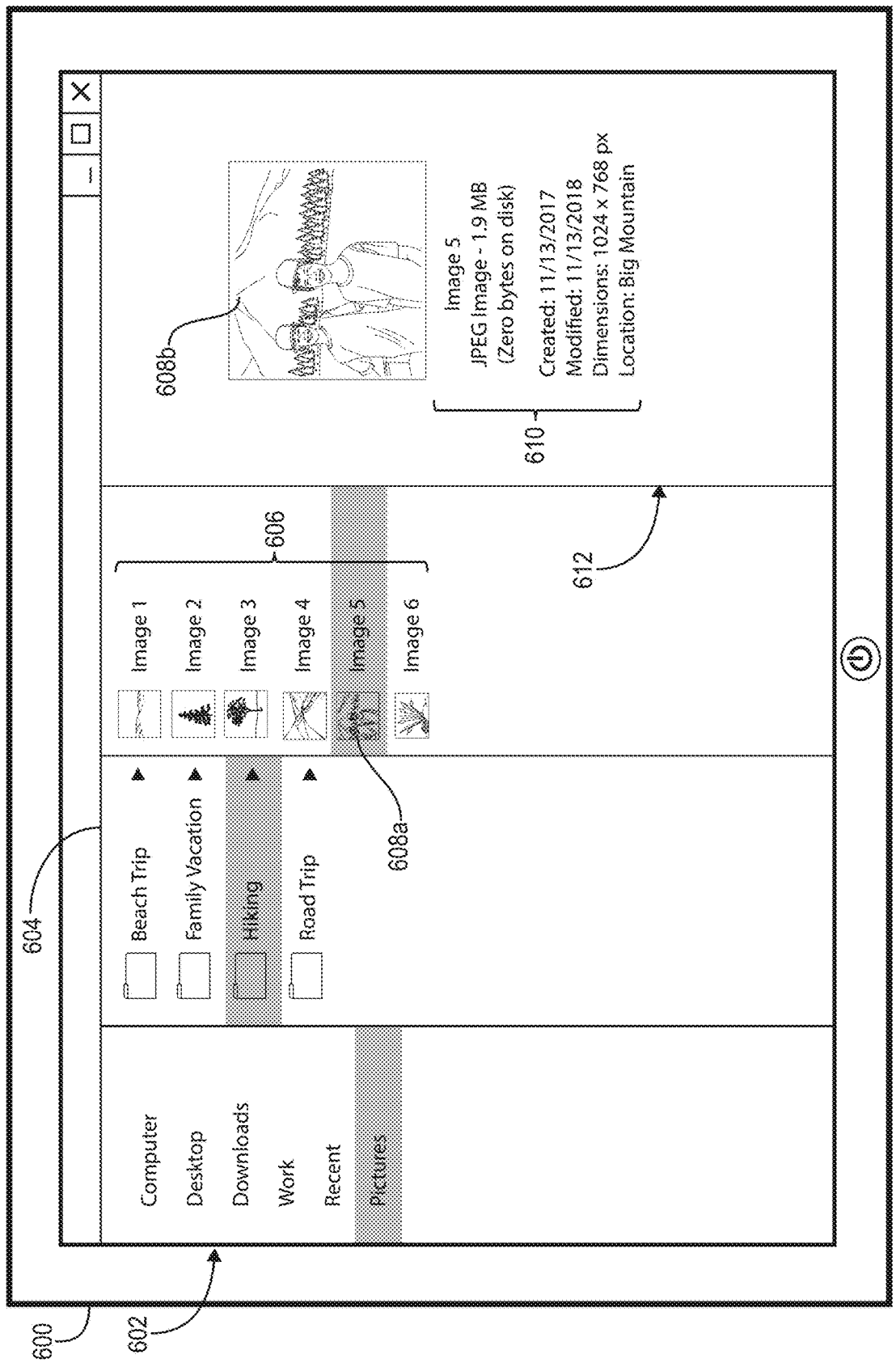
FIG. 6 illustrates an example client device having a user interface of a hierarchical folder that includes placeholder files in accordance with one or more embodiments.

Turning now to FIG. 6, additional detail is provided with respect to a hierarchical folder arrangement that includes placeholder files. In particular, FIG. 6 illustrates client device 600 displaying graphical user interface 602 of a hierarchical folder arrangement 604 that includes placeholders 606.

Hierarchical folder arrangement 604 enables client device 600 to display nested folders in graphical user interface 602 (shown as adjacent panes). As illustrated, hierarchical folder arrangement 604 includes placeholders 606 within a selected "Hiking" folder. Further, the Hiking folder is a subfolder of the selected "Pictures" directory maintained by the file management system.

In addition, in many embodiments, hierarchical folder arrangement 604 also includes information pane 612. When no file is selected, file management system 116 can hide information pane 612 or leave information pane blank. In response to detecting a user selecting a file, file management system 116 can show information pane 612 and populate information pane 612 with information (e.g., metadata) corresponding to the selected file.

To illustrate, FIG. 6 shows placeholder "Image 5" being selected. In response, file management system 116 populates information pane 612 to display metadata 610 corresponding to Image 5. Metadata 610 can include information about files generally, such as name, size, creation date, modification date, tags, etc. In some embodiments, metadata 610 includes file-type specific information. For instance, if the selected file is an image (or an image placeholder file), metadata 610 can include image-specific information such as image dimensions and captured location, as shown. Metadata associated with a selected file can include additional information. Further, in some embodiments, the file management system does not display all of a file's metadata in information pane 612.

Notably, information pane 612 shows that Image 5 is storing "Zero bytes on disk" while the size of the image is about 2 MB. Indeed, as mentioned above, placeholders do not include file contents and do not require a client device (e.g., client device 600) to use memory in caching a local copy of the file. Instead, placeholders provide information, such as metadata 610 to the file management system of a client device that enables the file management system to display the file, and corresponding information about the file, to a user.

As shown in FIG. 6, the selected placeholder (i.e., Image 5) is represented by two thumbnails of different sizes. For example, the size of first thumbnail 608a among placeholders 606 in the Hiking folder is smaller than the size of second thumbnail 608b shown in information pane 612. In particular, first thumbnail 608a is a smaller file size and/or resolution than second thumbnail 608b.

To display thumbnails of different sizes, file management system 116 can generate different thumbnails. As before, if the file is a placeholder, then file management system 116 cannot generate a thumbnail directly from the file. Instead, in various embodiments, file management system 116 requests a different size of thumbnail for the placeholder from thumbnail prefetching system 120 (e.g., if the requested thumbnail is larger than the thumbnail previously obtained by file management system 116).

To illustrate, in one or more embodiments, thumbnail prefetching system 120 receives two requests from file management system 116 that include a specified thumbnail size for the files (e.g., placeholders). In response, thumbnail prefetching system 120 fetches the two requested thumbnails at the specified size as well as thumbnails for additional files in the folder, as previously described. In particular, in these embodiments, thumbnail prefetching system 120 indicates to the server device the size of thumbnail needed.

In various embodiments, thumbnail prefetching system 120 can adjust the number of additional files identified and retrieved from the server device in a single request based on the size of thumbnails being retrieved. For example, when larger thumbnails are requested, thumbnail prefetching system 120 can reduce the batch number of prefetched thumbnails. In some embodiments, thumbnail prefetching system 120 can set a threshold data package size (e.g., 1 MB) and ensure that the combination of thumbnails size times the number of requested files does not exceed the threshold. Indeed, as the size of requested thumbnails increase, the number of prefetched additional thumbnails in a single batch decreases. In this manner, thumbnail prefetching system 120 can ensure that packages of prefetched thumbnails are not delayed over the network due to overly-large transfer sizes.

As described above, because thumbnail prefetching system 120 does not have access to the graphical user interface being displayed to a user (including which files in a folder are visible, which files are placeholders, and the sort order of the files), thumbnail prefetching system 120 deduces this information. In one or more embodiments, to determine the sort order, thumbnail prefetching system 120 gives greater weight or priority to a sort order determined for a parent, child, sibling folder, or previously accessed folder. For example, if thumbnail prefetching system 120 has successfully determined the sort order for a parent folder (e.g., based on the file management system requesting thumbnails for a set number of files in a row that thumbnail prefetching system 120 has prefetched), thumbnail prefetching system 120 may assume the same sort order for a child folder. In this manner, thumbnail prefetching system 120 can begin prefetching files when a single thumbnail request is received rather than waiting for two thumbnail requests.

Indeed, many operating systems have a default sort order or a systemwide set sort order. Thus, after determining the sort order for a number of folders, thumbnail prefetching system 120 can infer the same sort order and begin prefetching files when the first thumbnail request for a folder is detected (e.g., using the position of the file in the first thumbnail request in the inferred sort order to identify the additional files). If, however, file management system 116 then requests a thumbnail for a file whose thumbnails is not prefetched (e.g., the same sort order was incorrect, or the user scrolled within the folder), thumbnail prefetching system 120 can utilize the second (and subsequent) thumbnail requests to determine a different sort order for the folder, as described above.

Along similar lines, in various embodiments, thumbnail prefetching system 120 maintains a database or log of the sort order for each folder when thumbnail prefetching system 120 successfully determines the sort order of the folder. In this manner, when thumbnail prefetching system 120 detects a new thumbnail request at a later date, thumbnail prefetching system 120 determines if the folder has a stored sort order and/or if the determined sort order is less than a threshold age (e.g., to ensure freshness). If an unexpired sort order is identified for the folder, thumbnail prefetching system 120 can utilize the sort order and the first thumbnail request, as described above.

Furthermore, in additional or alternative embodiments, thumbnail prefetching system 120 can initially assume a default sort order (e.g., sort by name) and prefetch additional thumbnails in connection with the first thumbnail request detected from the file management system. In some embodiments, the batch size of additional identified files is smaller when utilizing the default sort order (e.g., half the size of a normal batch). Then, when a second thumbnail request is received, thumbnail prefetching system 120 can verify the default sort order or determine another sort order, as described above. Further, thumbnail prefetching system 120 can prefetch a full batch of predicted thumbnails in connection with receiving the second thumbnail request.

In one or more embodiments, thumbnail prefetching system 120 prefetches thumbnails from the server device in response to a thumbnail request for a thumbnail stored in a local cache. For example, thumbnail prefetching system 120 has a number of thumbnails stored in a local cache from one or more previous prefetch retrievals. If the number of thumbnails remaining in the cache drops below a threshold number (e.g., below 5), thumbnail prefetching system 120 can prefetch additional thumbnails for files in the folder utilizing the last two thumbnail requests, even if thumbnail prefetching system 120 had those thumbnails stored in the local cache. In this manner, thumbnail prefetching system 120 can continue to predict and provide thumbnails to file management system 116 before file management system 116 provides a corresponding thumbnail request.

As shown in FIG. 6, file management system 116 can request a larger thumbnail to accommodate second thumbnail 608b shown in information pane 612. If the user adjusts the size of information pane 612, the size of the displayed thumbnail can also grow or shrink, which could cause file management system 116 to request a thumbnail of a different size. In alternative embodiments, file management system 116 may provide an option to a user to modify the size of all thumbnails in a folder. In these embodiments, thumbnail prefetching system 120 provides thumbnails at the new sizes in response to new thumbnail requests, as described previously.

Figure 7:
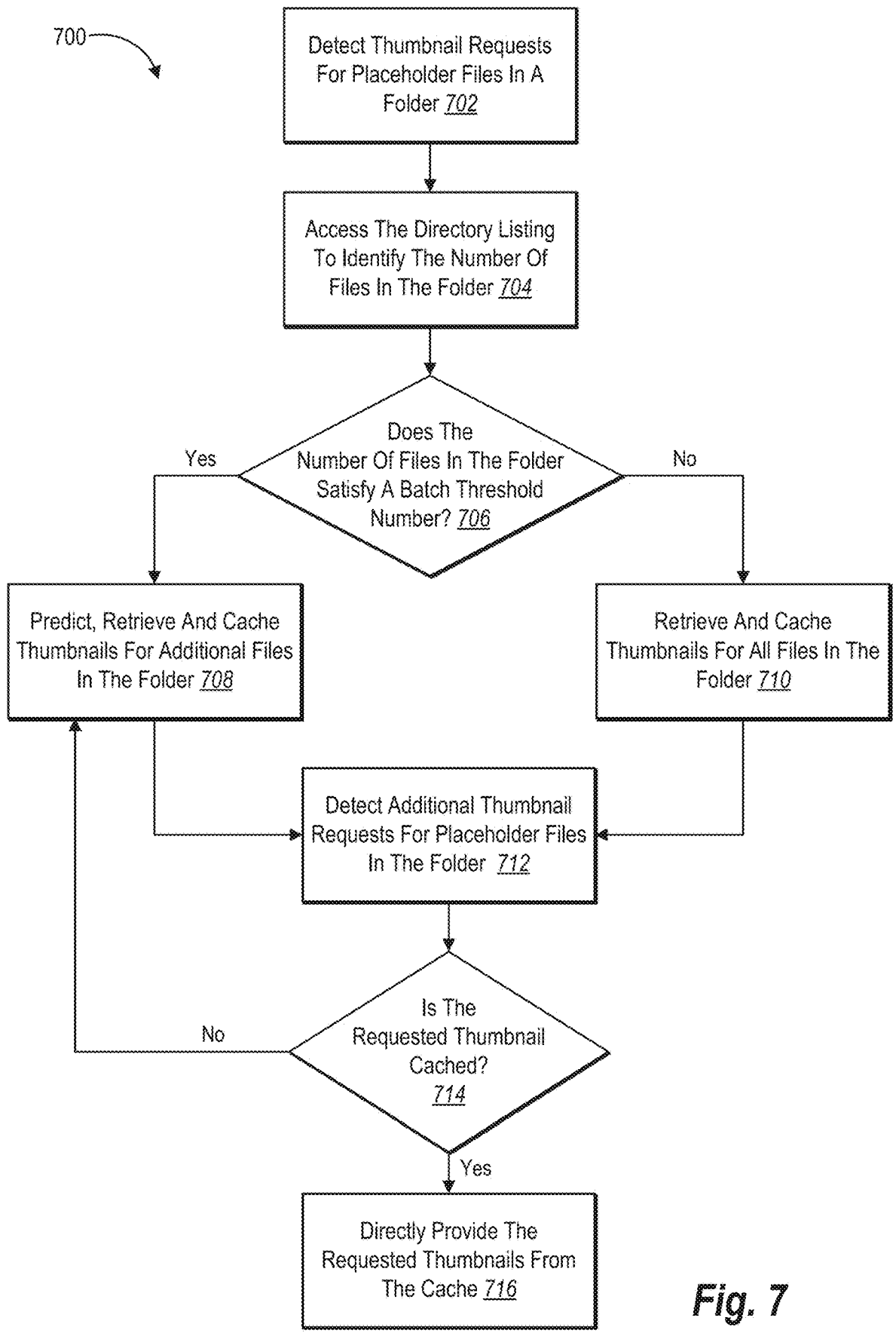
FIG. 7 illustrates a schematic diagram for prefetching thumbnails for files in a folder in accordance with one or more embodiments.

Moving to FIG. 7, this figure illustrates a schematic diagram of determining when to prefetch thumbnails for files in a folder in anticipation of the file management system next requesting the thumbnails. In particular, FIG. 7 shows series of acts 700 that thumbnail prefetching system 120 can perform to determine when to prefetch thumbnails.

As shown, series of acts 700 includes act 702 of detecting thumbnail requests for placeholder files (e.g., placeholders) in a folder. In one or more embodiments, thumbnail prefetching system 120 can receive the thumbnail requests as described above. For example, thumbnail prefetching system 120 detects the thumbnail requests from a file management system that cannot generate thumbnails for the placeholders in the folder.

In some embodiments, the folder is a synchronized folder that includes files maintained by an online content management system and where access is provided to a file management system to display the files on a client device. Indeed, a synchronized folder can include fully synchronized files and/or partially synchronized files (i.e., placeholders).

As shown, series of act 700 includes act 704 of accessing a directory listing to identify the number of files in a folder. As described above, thumbnail prefetching system 120 obtains a directory listing that identifies the files in the folder. In some embodiments, the directory listing indicates which files in the folder are subfolders and/or placeholders, as explained previously.

Upon accessing the directory listing, thumbnail prefetching system 120 can determine whether the number of files in the folder satisfies a batch threshold number, as shown in decision act 706. For example, if thumbnail prefetching system 120 identifies 24 additional files in a folder, but the folder includes less than 24 files (or placeholders), thumbnail prefetching system 120 need not determine the sort order of the folder as displayed to the user nor determine which files are visible to the user. Instead, as shown in act 710, thumbnail prefetching system 120 retrieves and caches thumbnails for all the files in the folder.

While the batch threshold number often matches the number of additional files in connection with a thumbnail request from the file management system, in various embodiments, the batch threshold number differs from the number of additional files for which to prefetch thumbnails. For example, the batch threshold number changes as the number of additional files for which to prefetch thumbnails changes, as described above (e.g., based on the size of the thumbnail being requested).

In alternative embodiments, the batch threshold number is fewer than the number of additional files for which to prefetch thumbnails. Indeed, the batch threshold number can be a default value independent of the number of additional files for which to prefetch thumbnails. For example, the batch threshold number is set to ensure that thumbnail prefetching system 120 does not retrieve too many files at one time, which could cause network delays due to larger file transfer sizes.

As shown, if thumbnail prefetching system 120 determines from the directory listing that the number of files in the folder satisfies the batch threshold number, thumbnail prefetching system 120 predicts, retrieves, and caches thumbnails for the additional files in the folder, as shown in act 708. The actions of predicting, retrieving, and caching thumbnails for the additional files is described previously. In various embodiments, act 708 also includes retrieving the requested thumbnails and providing them to the file management system in response to the previously detected thumbnail requests.

In addition, series of acts 700 includes act 712 of detecting additional thumbnail requests for placeholder files in the folder. As mentioned above, upon thumbnail prefetching system 120 fulfilling one thumbnail request for a file in a folder, the file management system provides another thumbnail request. Each time thumbnail prefetching system 120 provides a thumbnail to the file management system in response to a thumbnail request, the file management system provides an additional thumbnail request (e.g., one-by-one) until all of the visible placeholders displayed in the folder are represented by thumbnails.

Upon detecting the additional thumbnail request, thumbnail prefetching system 120 determines whether the requested thumbnail is cached, as act 714 illustrates. If the requested thumbnail is cached (e.g., stored in a local and/or temporary cache associated with thumbnail prefetching system 120), then thumbnail prefetching system 120 directly provides the requested thumbnail from the cache, as shown in act 716. Indeed, thumbnail prefetching system 120 can immediately provide the requested thumbnail to the file management system without needing to retrieve the thumbnail from a remote server device.

Otherwise, if, upon detecting the additional thumbnail request, thumbnail prefetching system 120 determines that the requested thumbnail is not cached, thumbnail prefetching system 120 reverts back to act 708 of predicting, retrieving, and caching thumbnails for additional files in the folder (including retrieving the requested thumbnail and providing it to the file management system). In this manner, thumbnail prefetching system 120 can further prefetch thumbnails for other files in the folder for which the file management system may next request.

Figure 8:
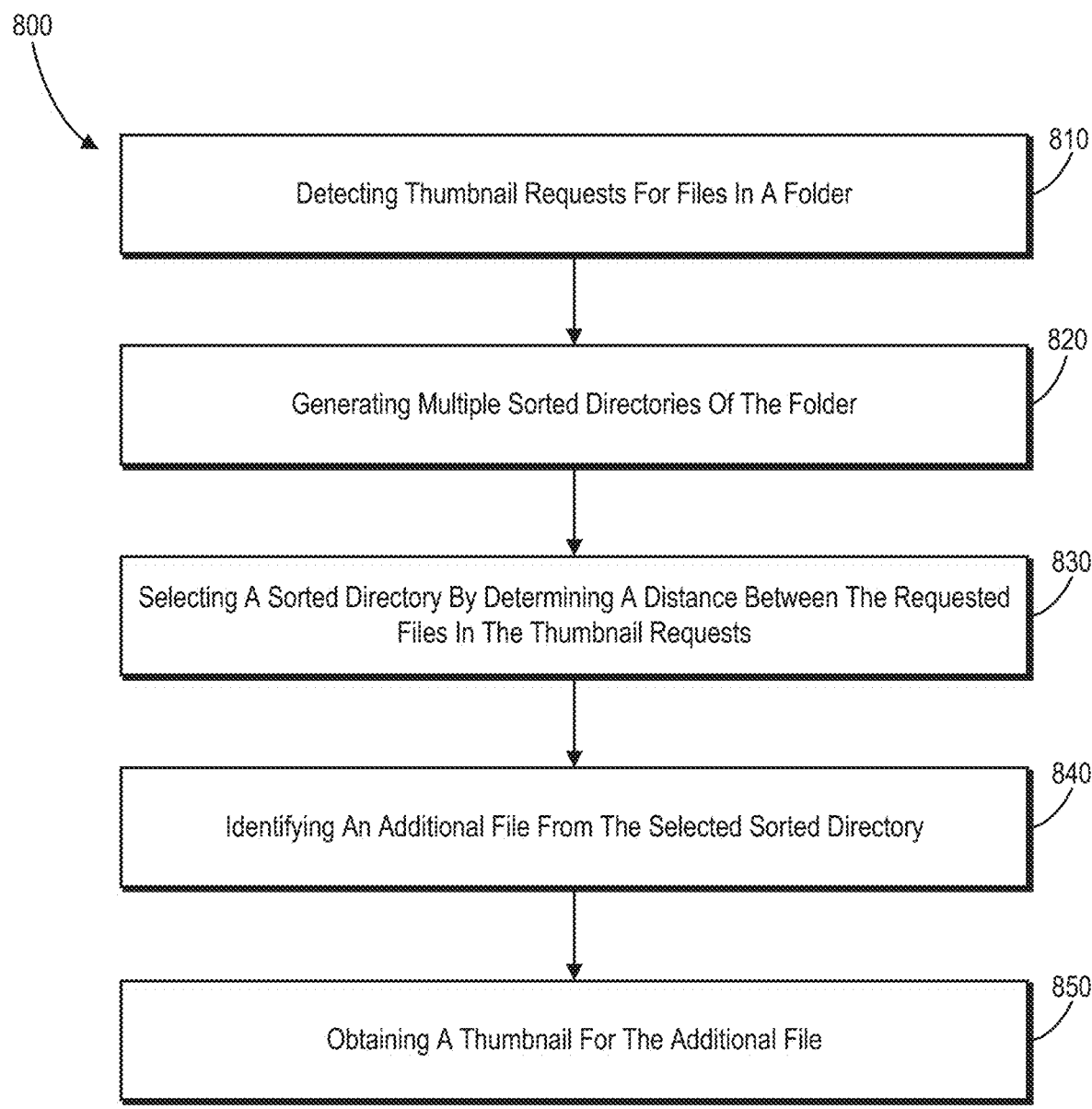
FIG. 8 illustrates a flowchart of a series of acts in a method for prefetching thumbnails for files in a folder prior to a client device making thumbnail requests for the files in accordance with one or more embodiments.

FIGS. 1-7, the corresponding text, and the examples provide several different systems, methods, techniques, components, and/or devices of thumbnail prefetching system 120 in accordance with one or more embodiments. In addition to the above description, one or more embodiments can also be described in terms of flowcharts including acts for accomplishing a particular result. For example, FIG. 8 illustrates flowcharts of an example sequence of acts in accordance with one or more embodiments. In addition, FIG. 8 may be performed with more or fewer acts. Further, the acts may be performed in differing orders. Additionally, the acts described herein may be repeated or performed in parallel with one another or parallel with different instances of the same or similar acts.

While FIG. 8 illustrates series of acts 800 according to particular embodiments, alternative embodiments may omit, add to, reorder, and/or modify any of the acts shown. The series of acts of FIG. 8 can be performed as part of a method. Alternatively, a non-transitory computer-readable medium can comprise instructions, when executed by one or more processors, cause a computing device (e.g., a client device and/or a server device) to perform the series of acts of FIG. 8. In still further embodiments, a system performs the acts of FIG. 8.

To illustrate, FIG. 8 shows a flowchart of series of acts 800 for generating enhanced digital images by transforming raster-based elements in raster images to vector drawing segments in accordance with one or more embodiments. As shown, series of acts 800 includes act 810 of detecting thumbnail requests for files in a folder. In particular, act 810 includes detecting thumbnail requests for a first file and a second file within a file directory including a plurality of files. In one or more embodiments, the first file and the second file within the file directory are placeholder files having metadata labels. In some embodiments, additional digital content for the placeholder files is stored at a remote server. Indeed, in various embodiments, full copies of the first file and the second file are stored on a remote server device.

In various embodiments, act 810 includes receiving the thumbnail requests from an operating system of a client device. For example, a file management system within the operating system may provide the thumbnails requests. In additional embodiments, the operating system is unable to generate thumbnails for the placeholder files (e.g., the first file and the second file). Indeed, in some embodiments, the operating system is unable to generate thumbnails for the placeholder files from only the metadata labels stored on the client device.

As shown, series of acts 800 includes act 820 of generating multiple sorted directories of the folder. In particular, act 820 includes generating a plurality of sorted directories from the file directory by arranging the plurality of files according to a plurality of sort orders. In some embodiments, act 820 includes accessing a file directory to identify a plurality of files, where the plurality of files includes the first file and the second file. In various embodiments, the plurality of sorted orders includes a sort order by name, a sort order by size, a sort order by modification date, and a sort order by file type.

In addition, as shown, series of acts 800 includes act 830 of selecting a sorted directory by determining a distance between the requested files in the thumbnail requests. In particular, act 830 includes selecting a sorted directory from the plurality of sorted directories by determining a distance between the first file and the second file for each of the plurality of sorted directories. In various embodiments, act 830 includes identifying a first distance between a position of the first file and a position of the second file for a first sorted directory of the plurality of sorted directories; identifying a second distance between an additional position of the first file and an additional position of the second file for a second sorted directory; selecting the first sorted directory from the plurality of sorted directories by comparing the first distance and the second distance. Indeed, in some embodiments, act 830 includes comparing the first distance and the second distance and selecting the first sorted directory based on determining that the second distance is greater than the first distance.

As shown, series of acts 800 also includes act 840 of identifying an additional file from the selected sorted directory. In particular, act 840 includes identifying an additional file from the file directory based on the sorted directory. In one or more embodiments, act 840 includes retrieving thumbnails for additional files of the file directory based on the first sorted directory and the position of the second file within the first sorted directory. For example, in some embodiments, act 840 includes identifying a file adjacent to the position of the second file in the first sorted directory. In many embodiments, act 840 includes identifying files of the plurality of files in the first sorted directory having positions that extend out or away from the position of the second file within the first sorted directory until a predetermined number of additional files are identified.

Further, series of acts 800 includes act 850 of obtaining a thumbnail for the additional file. In particular, act 850 includes obtaining a thumbnail corresponding to the additional file in response to the thumbnail requests for the first file and the second file. In one or more embodiments, act 850 includes requesting, from a server device, thumbnails for the second file and the additional file, as well as receiving, from the server device prior to an additional thumbnail request from the operating system for the additional file, the thumbnails for the second file and the additional file.

Series of acts 800 can include one or more additional acts. For example, in various embodiments, series of acts 800 includes an act of providing, to the operating system of the client device, the thumbnail for the second file in response to the thumbnail request for the second file. In some embodiments, series of acts 800 includes the acts of storing the thumbnail for the additional file in a local thumbnail cache (e.g., temporary memory) on the client device associated with the file directory; detecting, from the operating system of the client device, an additional thumbnail request for the additional file; and providing, to the operating system of the client device, the thumbnail for the additional file in response to the additional thumbnail request.

In one or more embodiments, series of acts 800 includes the acts of detecting a thumbnail request for a third file within the file directory; selecting a new sorted directory from the plurality of sorted directories by determining a new distance between the second file and the third file for each of the plurality of sorted directories; identifying further additional files from the file directory based on the new sorted directory; and providing thumbnails corresponding to the further additional files in response to the thumbnail requests for the second file and the third file.

Embodiments of the present disclosure can include or utilize a special-purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can include at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives, Flash memory, phase-change memory, other types of memory, other optical disk storage, magnetic disk storage or other magnetic storage devices, or any other medium used to store desired program code means in the form of computer-executable instructions or data structures, and accessible by a general-purpose or special-purpose computer.

Computer-executable instructions include, for example, instructions and data which, when executed by a processor, cause a general-purpose computer, special-purpose computer, or special-purpose processing device to perform a certain function or group of functions. In some embodiments, a general-purpose computer executes computer-executable instructions to turn the general-purpose computer into a special-purpose computer implementing elements of the disclosure. The computer-executable instructions can be, for example, binaries, intermediate format instructions such as assembly language, or even source code. Although the subject matter has been described in language specific to structural features and/or methods, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and the claims, a "cloud computing environment" is an environment in which cloud computing is employed.

Figure 9:
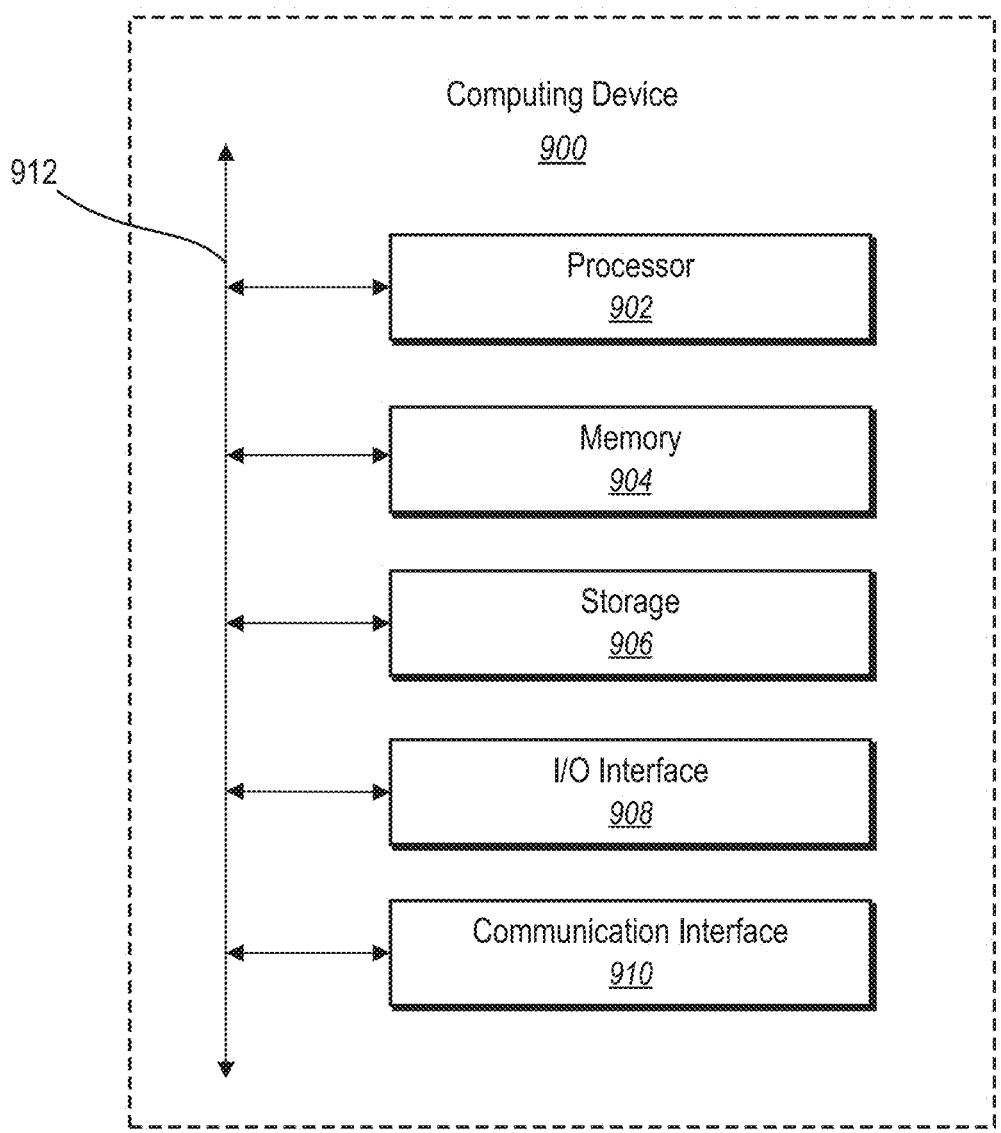
FIG. 9 illustrates a block diagram of a computing device in accordance with one or more embodiments.

FIG. 9 illustrates a block diagram of an example computing device 900 that can be configured to perform one or more of the processes described above. One or more computing devices, such as the computing device 900 can represent the client devices 112, 400, 600, and server devices 102 described above. In one or more embodiments, the computing device 900 can be a mobile device (e.g., a mobile telephone, a smartphone, a PDA, a tablet, a laptop, a camera, a tracker, a watch, a wearable device, etc.). In some embodiments, the computing device 900 can be a non-mobile device (e.g., a desktop computer or another type of client device). Further, the computing device 900 can be a server device that includes cloud-based processing and storage capabilities.

As shown in FIG. 9, the computing device 900 can include one or more processor(s) 902, memory 904, a storage device 906, input/output ("I/O") interfaces 908, and a communication interface 910, which can be communicatively coupled by way of a communication infrastructure (e.g., bus 912). While the computing device 900 is shown in FIG. 9, the components illustrated in FIG. 9 are not intended to be limiting. Additional or alternative components can be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 can retrieve (or fetch) the instructions from an internal register, an internal cache, memory 904, or a storage device 906 and decode and execute them. In particular embodiments, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage 906.

The computing device 900 includes memory 904, which is coupled to the processor(s) 902. The memory 904 can be used for storing data, metadata, and programs for execution by the processor(s). The memory 904 can include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 can be internal or distributed memory.

The computing device 900 includes a storage device 906 includes storage for storing data or instructions. As an example, and not by way of limitation, the storage device 906 can include a non-transitory storage medium described above. The storage device 906 can include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as digital strokes), receive output from, and otherwise transfer data to and from the computing device 900. These I/O interfaces 908 can include a mouse, keypad or a keyboard, a touchscreen, camera, optical scanner, network interface, modem, other known I/O devices or a combination of such I/O interfaces 908. The touchscreen can be activated with a stylus or a finger.

The I/O interfaces 908 can include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data can be representative of one or more graphical user interfaces and/or any other graphical content as can serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 can include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

Figure 10:
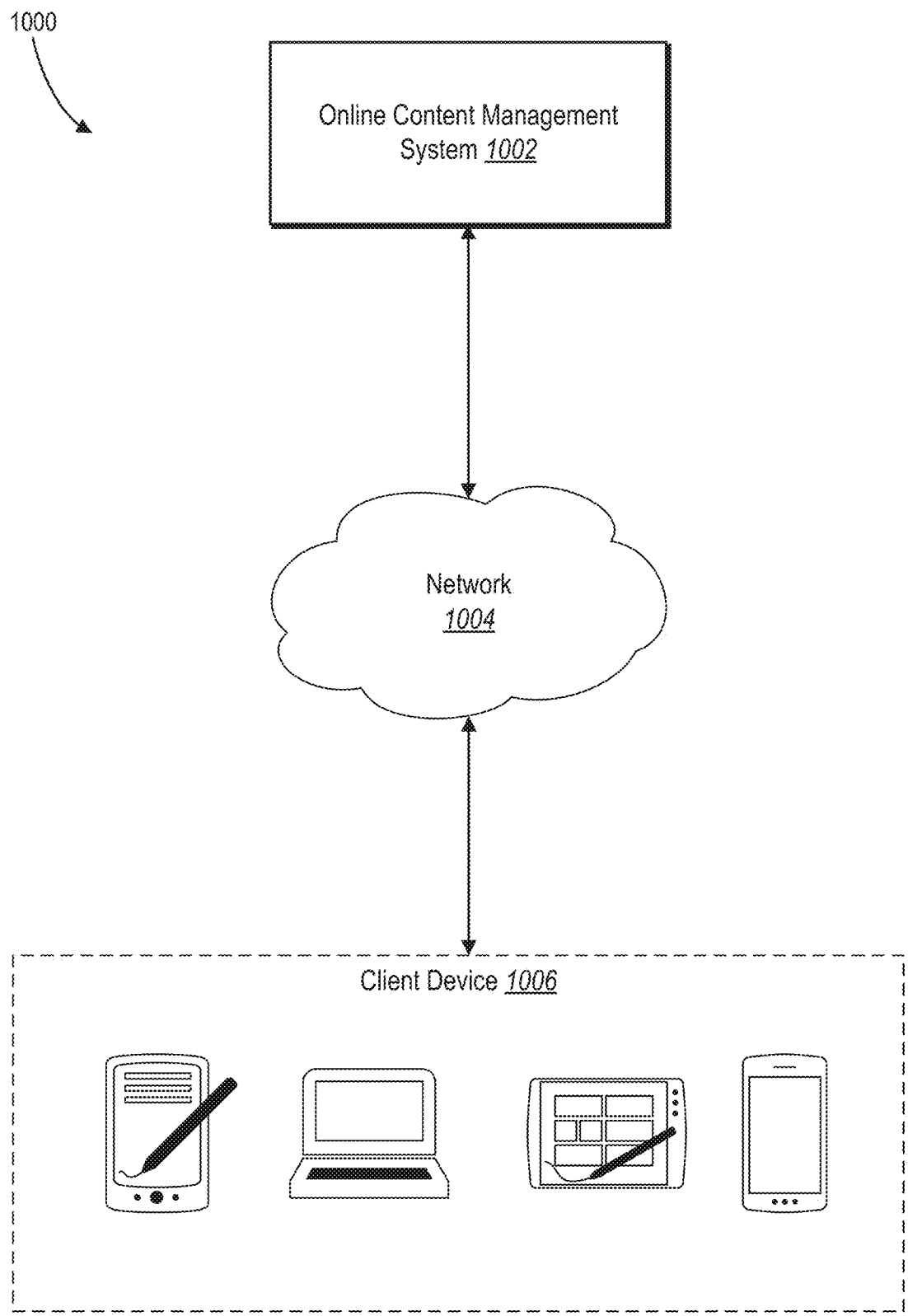
FIG. 10 illustrates a networking environment of a digital content management system in accordance with one or more embodiments.

FIG. 10 is a schematic diagram illustrating environment 1000 within which thumbnail prefetching system 120 described above can be implemented. Online content management system 1002 may generate, store, manage, receive, and send digital content (such as digital videos). For example, online content management system 1002 may send and receive digital content to and from client devices 1006 by way of network 1004. In particular, online content management system 1002 can store and manage a collection of digital content. Online content management system 1002 can manage the sharing of digital content between computing devices associated with a plurality of users. For instance, online content management system 1002 can facilitate a user sharing digital content with another user of online content management system 1002.

In particular, online content management system 1002 can manage synchronizing digital content across multiple client devices 1006 associated with one or more users. For example, a user may edit digital content using client device 1006. The online content management system 1002 can cause client device 1006 to send the edited digital content to online content management system 1002. Online content management system 1002 then synchronizes the edited digital content on one or more additional computing devices.

In addition to synchronizing digital content across multiple devices, one or more embodiments of online content management system 1002 can provide an efficient storage option for users that have large collections of digital content. For example, online content management system 1002 can store a collection of digital content on online content management system 1002, while the client device 1006 only stores reduced-sized versions of the digital content. A user can navigate and browse the reduced-sized versions (e.g., a thumbnail of a digital image) of the digital content on client device 1006. In particular, one way in which a user can experience digital content is to browse the reduced-sized versions of the digital content on client device 1006.

Another way in which a user can experience digital content is to select a reduced-size version of digital content to request the full- or high-resolution version of digital content from online content management system 1002. In particular, upon a user selecting a reduced-sized version of digital content, client device 1006 sends a request to online content management system 1002 requesting the digital content associated with the reduced-sized version of the digital content. Online content management system 1002 can respond to the request by sending the digital content to client device 1006. Client device 1006, upon receiving the digital content, can then present the digital content to the user. In this way, a user can have access to large collections of digital content while minimizing the amount of resources used on client device 1006.

Client device 1006 may be a desktop computer, a laptop computer, a tablet computer, a personal digital assistant (PDA), an in- or out-of-car navigation system, a handheld device, a smartphone or other cellular or mobile phone, or a mobile gaming device, other mobile device, or other suitable computing devices. Client device 1006 may execute one or more client applications, such as a web browser (e.g., MICROSOFT WINDOWS INTERNET EXPLORER, MOZILLA FIREFOX, APPLE SAFARI, GOOGLE CHROME, OPERA, etc.) or a native or special-purpose client application (e.g., FACEBOOK for iPhone or iPad, FACEBOOK for ANDROID, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1006 may access online content management system 1002.

In the foregoing specification, the present disclosure has been described with reference to specific example embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method, comprising:
   detecting thumbnail requests for a first file and a second file within a file directory comprising a plurality of files;
   generating a plurality of sorted directories from the file directory by arranging the plurality of files according to a plurality of sort orders;
   selecting a sorted directory from the plurality of sorted directories by determining a file directory distance between the first file and the second file for each of the plurality of sorted directories;
   identifying an additional file from the file directory based on the sorted directory; and
   obtaining a thumbnail corresponding to the additional file in response to the thumbnail requests for the first file and the second file.

2. The computer-implemented method of claim 1, wherein the first file and the second file within the file directory are placeholder files comprising metadata labels and wherein additional digital content for the placeholder files are stored at a remote server.

3. The computer-implemented method of claim 2, wherein:
   detecting the thumbnail requests comprises receiving the thumbnail requests from an operating system of a client device; and
   the operating system is unable to generate thumbnails for the placeholder files comprising the first file and the second file.

4. The computer-implemented method of claim 3, wherein obtaining the thumbnail corresponding to the additional file comprises:
   requesting, from a server device, thumbnails for the second file and the additional file; and
   receiving, from the server device prior to an additional thumbnail request from the operating system for the additional file, the thumbnails for the second file and the additional file.

5. The computer-implemented method of claim 4, further comprising:
   providing, to the operating system of the client device, the thumbnail for the second file in response to the thumbnail request for the second file;
   storing the thumbnail for the additional file in a local thumbnail cache on the client device associated with the file directory;
   detecting, from the operating system of the client device, an additional thumbnail request for the additional file; and
   providing, to the operating system of the client device, the thumbnail for the additional file in response to the additional thumbnail request.

6. The computer-implemented method of claim 1, wherein the plurality of sorted orders comprises a sort order by name, a sort order by size, a sort order by modification date, and a sort order by file type.

7. The computer-implemented method of claim 1, wherein determining the file directory distance between the first file and the second file for each of the plurality of sorted directories comprises:
   determining a first file directory distance between a position of the first file in a first sorted directory and a position of the second file in the first sorted directory; and
   determining a second file directory distance between an additional position of the first file in a second sorted directory and an additional position of the second file in the second sorted directory.

8. The computer-implemented method of claim 7, selecting the sorted directory from the plurality of sorted directories further comprises:
   comparing the first file directory distance and the second file directory distance; and
   selecting the first sorted directory as the sorted directory based on determining that the second file directory distance is greater than the first file directory distance.

9. The computer-implemented method of claim 8, wherein identifying the additional files from the file directory comprises identifying a file adjacent to the position of the second file in the first sorted directory.

10. The computer-implemented method of claim 1, further comprising:
    detecting a thumbnail request for a third file within the file directory;
    selecting a new sorted directory from the plurality of sorted directories by determining a new file directory distance between the second file and the third file for each of the plurality of sorted directories;
    identifying further additional files from the file directory based on the new sorted directory; and
    providing thumbnails corresponding to the further additional files in response to the thumbnail requests for the second file and the third file.

11. A system, comprising:
    at least one processor; and
    at least one non-transitory computer-readable storage medium storing instructions thereon that, when executed by the at least one processor, cause the system to:
    detect a first thumbnail request for a first file and a second thumbnail request for a second file within a file directory comprising a plurality of files;
    generate a plurality of sorted directories from the file directory by arranging the plurality of files according to a plurality of sort orders;
    identify a first file directory distance between a position of the first file and a position of the second file for a first sorted directory of the plurality of sorted directories;
    identify a second file directory distance between an additional position of the first file and an additional position of the second file for a second sorted directory;
    select the first sorted directory from the plurality of sorted directories by comparing the first file directory distance and the second file directory distance; and
    retrieve thumbnails for additional files of the file directory based on the first sorted directory and the position of the second file within the first sorted directory.

12. The system of claim 11, wherein retrieving the thumbnails for the additional files comprises:

identifying additional files from the file directory based on the first sorted directory and the position of the second file within the first sorted directory; and obtaining thumbnail corresponding to the additional files in response to the thumbnail requests for the first file and the second file.

13. The system of claim 12, wherein retrieving the thumbnails for the additional files further comprises identifying files of the plurality of files in the first sorted directory having positions that extend out from the position of the second file within the first sorted directory until a predetermined number of additional files are identified.

14. The system of claim 11, wherein:

the first file and the second file within the file directory are placeholder files having metadata labels stored on a client device; and full copies of the first file and the second file are stored on a server device.

15. The system of claim 11, wherein the plurality of sorted orders comprises a sort order by name, a sort order by size, a sort order by modification date, and a sort order by file type.

16. A non-transitory computer-readable medium storing instructions thereon that, when executed by at least one processor, cause a computer system to:

identify thumbnail requests from an operating system of a client device for a first file and a second file within a file directory;

access the file directory to identify a plurality of files, wherein the plurality of files comprises the first file and the second file;

sort the plurality of files into a plurality of sort orders;

select a sorted order from the plurality of sort orders by determining a file directory distance between the first file and the second file for each of the plurality of sort orders;

identify additional files from the file directory based on the selected sort order;

obtain, from a server device, the thumbnails for the second file and the additional files prior to an additional thumbnail request for the additional files from the operating system; and provide, in response to the additional thumbnail request for the additional files from the operating system, to the operating system of the client device, the thumbnails corresponding to the additional files.

17. The non-transitory computer-readable medium of claim 16, wherein:

the first file and the second file within the file directory are placeholder files having metadata labels stored on the client device; and full copies of the first file and the second file are stored on the server device.

18. The non-transitory computer-readable medium of claim 17, wherein the operating system is unable to generate thumbnails for the placeholder files from only the metadata labels stored on the client device.

19. The non-transitory computer-readable medium of claim 16, wherein identifying the additional files comprises identifying files of the plurality of files in the file directory that are adjacent to the second file until a predetermined number of additional files are identified, wherein the file directory is arranged in the selected sort order.

20. The non-transitory computer-readable medium of claim 16, further comprising instructions thereon that, when executed by at least one processor, cause a computer system to:

store the thumbnail for the additional file in temporary memory on the client device associated with the file directory;

detect, from the operating system of the client device, an additional thumbnail request for the additional file; and provide, to the operating system of the client device, the thumbnail for the additional file in response to the additional thumbnail request.

\* \* \* \* \*